(12) United States Patent
Wada et al.

(10) Patent No.: US 12,024,448 B2
(45) Date of Patent: Jul. 2, 2024

(54) SOLID-LIQUID SEPARATION DEVICE

(71) Applicant: AMCON INC., Yokohama (JP)

(72) Inventors: Koji Wada, Yokohama (JP); Kimitake Banno, Yokohama (JP); Takashi Yamasaki, Yokohama (JP); Chaozhi Zheng, Fujian (CN); Kevin Ayemperoumal, Praha-zapad (CZ)

(73) Assignee: AMCON INC., Yokohama (JP)

( * ) Notice: Subject to any disclaimer, the term of this patent is extended or adjusted under 35 U.S.C. 154(b) by 393 days.

(21) Appl. No.: 17/422,766

(22) PCT Filed: Nov. 26, 2019

(86) PCT No.: PCT/JP2019/046058
§ 371 (c)(1),
(2) Date: Jul. 14, 2021

(87) PCT Pub. No.: WO2020/170538
PCT Pub. Date: Aug. 27, 2020

(65) Prior Publication Data
US 2022/0064044 A1 Mar. 3, 2022

(30) Foreign Application Priority Data
Feb. 20, 2019 (JP) .................. 2019-028925

(51) Int. Cl.
*C02F 11/12* (2019.01)
*B01D 29/35* (2006.01)
(Continued)

(52) U.S. Cl.
CPC .......... *C02F 11/125* (2013.01); *B01D 29/356* (2013.01); *B01D 29/46* (2013.01);
(Continued)

(58) Field of Classification Search
CPC ................ C02F 11/125; C02F 2103/14; C02F 2103/20; C02F 2103/32; C02F 2201/002;
(Continued)

(56) References Cited

U.S. PATENT DOCUMENTS 9,387,641 B2   7/2016   Kaneko et al.

FOREIGN PATENT DOCUMENTS

JP   S61235099 A   10/1986
JP   4374396 B1    12/2009
(Continued)

OTHER PUBLICATIONS

Machine-generated English translation of JP 2017-1022, generated on Oct. 5, 2023.*

(Continued)

*Primary Examiner* — Fred Prince
(74) *Attorney, Agent, or Firm* — Davidson Kappel LLC

(57) ABSTRACT

In a solid-liquid separation apparatus, which comprises multiple movable members and screws that extend and pass through the movable members without contacting the movable members and which dehydrates sludge while conveying same by means of the rotation of the screws, to apply a wringing action on the sludge and increase sludge dehydration efficiency. (Solution) A first movable unit 41 is configured by linking multiple movable members 4A and 4B as a unit with a linking rod 44, a second movable unit 41A is configured by linking multiple other movable members 4C and 4D as a unit with a linking rod 44A, and the movable members 4A and 4B of the first movable unit 41 and the movable members 4C and 4D of the second movable unit 41A are reciprocated with a phase difference.

5 Claims, 16 Drawing Sheets

(51) Int. Cl.
  *B01D 29/46* (2006.01)
  *B01D 29/64* (2006.01)
  *B01D 29/82* (2006.01)
  *B01D 29/94* (2006.01)
  *C02F 11/125* (2019.01)
  *C02F 103/14* (2006.01)
  *C02F 103/20* (2006.01)
  *C02F 103/32* (2006.01)

(52) U.S. Cl.
  CPC ....... *B01D 29/6476* (2013.01); *B01D 29/828* (2013.01); *B01D 29/94* (2013.01); *C02F 2103/14* (2013.01); *C02F 2103/20* (2013.01); *C02F 2103/32* (2013.01); *C02F 2201/002* (2013.01); *C02F 2209/03* (2013.01)

(58) Field of Classification Search
  CPC . C02F 2209/03; B01D 29/356; B01D 29/828; B01D 29/94; B01D 29/46; B01D 29/6476; B01D 29/35
  USPC .................................................. 210/413, 415
  See application file for complete search history.

(56) References Cited

FOREIGN PATENT DOCUMENTS

| JP | 2010172784 A | | 8/2010 |
|---|---|---|---|
| JP | 2012166187 A | | 9/2012 |
| JP | 2017-1022 A | * | 1/2017 |

OTHER PUBLICATIONS

International Search Report of PCT/JP2019/046058, dated Jan. 7, 2020.

* cited by examiner (a)

(b)

SOLID-LIQUID SEPARATION DEVICE

TECHNICAL FIELD

The present disclosure relates to a solid-liquid separation device includes a plurality of movable members and a screw that extends through the movable members in a state where the screw is not contact with the movable members and subjects an object to be treated containing liquid to liquid removal treatment while conveying by the rotation the screw.

BACKGROUND

The solid-liquid separation device of above-described system is conventionally well-known as for separating a liquid from the objects to be treated containing liquid, e.g. organic sludge such as soybean wastes, wastewater from food processing, sewage drainage, or wastewater discharged from hog farms, sludge obtained by decomposition of aforementioned organic sludge with microorganisms, inorganic sludge such as waste liquid from plating, ink waste liquid, pigment waste liquid, or paint waste liquid, and also vegetable wastes, fruit peelings, food residues, and tofu refuse (See the disclosure of Japanese Patent Publication No. 4374396B1). In the solid-liquid separation device of above-described system, as the movable members actuate, solids can be prevented from being clogged in filtrate discharge gaps, furthermore, as the movable members do are not in contact with the screw, the movable members can be prevented from being rapidly worn out. However, in the conventional solid-liquid separation device of this system, the movable members could be prevented from being rapidly worn out for sure, whereas because all the movable members were configured so as to operate with the same phase and mode, the squeezing action applied by the movable members to an object to be treated while conveying by the rotation of screw was so insufficient that the efficiency of dewatering from the objects decreased and it inevitably couldn't subject effectively the objects to liquid removal treatment.

SUMMARY

In view of the foregoing recognition, an object of the present disclosure is to provide a solid-liquid separation device wherein the movable members can effectively apply their squeezing action to an object to be treated while conveying without coming into contact with the screw, thereby allowing the efficiency of dewatering from the object to be significantly enhanced.

A solid-liquid separation device is provided which is provided with a plurality of movable members and a screw that extends through the movable members without in a state where the screw is not contact with the movable members and which subjects an object to be treated containing liquid to liquid removal treatment while conveying the object by the rotation of the screw, wherein the solid-liquid separation device is characterized in comprising first and second movable units that include the plurality of movable members, connection means for connecting the plurality of movable members so as to operate together, and driving means to drive the plurality of movable members, wherein the driving means of the first movable unit and the driving means of the second movable unit cause the movable members of the first and second movable units to perform reciprocating motion in different phases from each other (claim 1).

Further, a solid-liquid separation device is provided which is provided with a plurality of movable members and a screw that extends through the movable members in a state where the screw is not contact with the movable members and which subjects an object to be treated containing liquid to liquid removal treatment while conveying the object by the rotation of the screw, wherein the solid-liquid separation device is characterized in comprising at least two sets of movable units that include a driving member composed of one of the plurality of movable members and at least one driven member composed of other of the plurality of movable members, a connection means for connecting the driving member and the driven member so as to operate together, and a cam to pressurize the driving member to perform linear reciprocating motion, wherein two cams adjacent to each other in an axial direction of the screw are disposed in different phases from each other such that the movable members of the movable unit to which each cams belong perform linear reciprocating motion with phase difference, and wherein the cams for all the movable units are fixed to a common driving shaft which is rotationally driven by a motor.

Further, in the solid-liquid separation device, the movable unit advantageously has an intermediate member pivotally connected to the driving member thereof and a guiding means to guide at least one of the driving member and the driven member such that the driving member and the driven member on the movable unit to which the driving member belongs perform linear reciprocating motion in a vertical direction when the driving member is pressurized via the intermediate member by the rotation of the cam, wherein the cam consists of an eccentric cam and slidably fits into a round cam hole on a center side of a bearing fitted into a hole formed through the intermediate member.

Additionally, the solid-liquid separation device be configured such that the two movable members positioned adjacent to each other in the axial direction of the screw can reciprocate in different phases from each other.

Moreover, the solid-liquid separation device can be configured such that it comprises a plurality of fixed members disposed in a state where they are not contact with the screw, the screw extends through the movable members and the fixed members, and one movable member is disposed between the fixed members positioned adjacent to each other in the axial direction of the screw.

Furthermore, the solid-liquid separation device can be configured such that it comprises the plurality of fixed members disposed in a state where they are not contact with the screw, wherein the screw extends through the movable members and the fixed members, wherein the plurality of movable members are disposed between the fixed members positioned adjacent to each other in the axial direction of the screw, and wherein said plurality of movable members, the two of which positioned adjacent to each other in the axial direction of the screw, can perform linear reciprocating motion with a different phase from each other.

According to the present disclosure, the movable members are configured not come into contact with the screw, but the movable members operate with phase difference so that it allows the movable members to apply a different mode of pressure to an object to be treated while conveying to effectively provide a squeezing action, thereby, enhancing the efficiency of dewatering for the object. Additionally, it is configured such that the plurality of movable members are connected with the connection means so as to operate together, thereby it allows the configuration of the solid-liquid separation device to be simplified.

DETAILED DESCRIPTION

Hereafter, the present disclosure will be discussed in detail with reference to the accompanying drawings.

Figure 1:
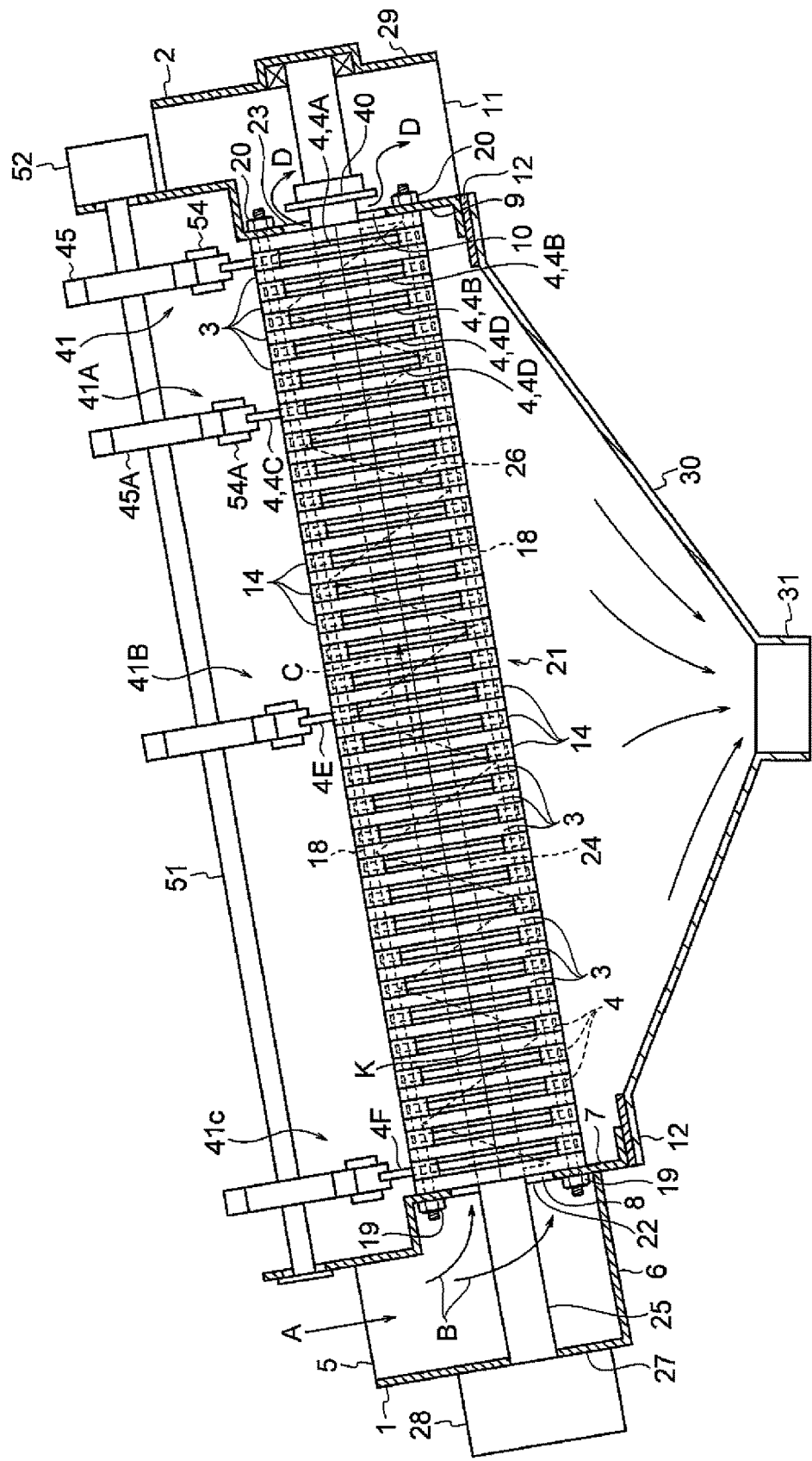
FIG. 1 is a partially cross-sectional frontal view of the solid-liquid separation device, which illustrates the schematic configuration of the device as a whole and is intended to clarify the arrangement state of the fixed members and the movable members and wherein the shapes and the like of the fixed members and the movable members are simplified and the depictions of some of the constituent members are omitted.

FIG. 1 is a partially cross-sectional frontal view illustrating one example of the solid-liquid separation device. With the solid-liquid separation device shown herein, various kinds of objects to be treated containing liquid can be separated into solid and liquid, but here, it will be discussed the case that the sludge containing a great amount of water is subjected to liquid removal treatment.

The solid-liquid separation device shown in FIG. 1 comprises an inlet member 1 formed to a box-shape of which an upper portion is open, an outlet member 2 having a rectangular cross-sectional shape of which the upper and lower portions are open, and a number of fixed members 3 and movable members 4 which are disposed between the inlet member 1 and the outlet member 2. The upper opening of the inlet member 1 acts as an inflow opening 5 into which the sludge flows, and the lower portion of the inlet member 1 is occluded by a bottom wall 6. Further, an opening 8 is formed in a side wall 7 of the inlet member 1 on the side which faces the fixed members 3 and the movable members 4. Similarly, an opening 10 is formed in a side wall 9 of the outlet member 2 on the side which faces the fixed members 3 and the movable members 4 as well, in which the lower opening of the outlet member 2 acts as a discharge port 11 from which the caked sludge subjected to liquid removal treatment is discharged. Such outlet member 2 and inlet member 1 are fixedly supported at their lower portions to a stay 12 of the supporting frame.

Figure 2:
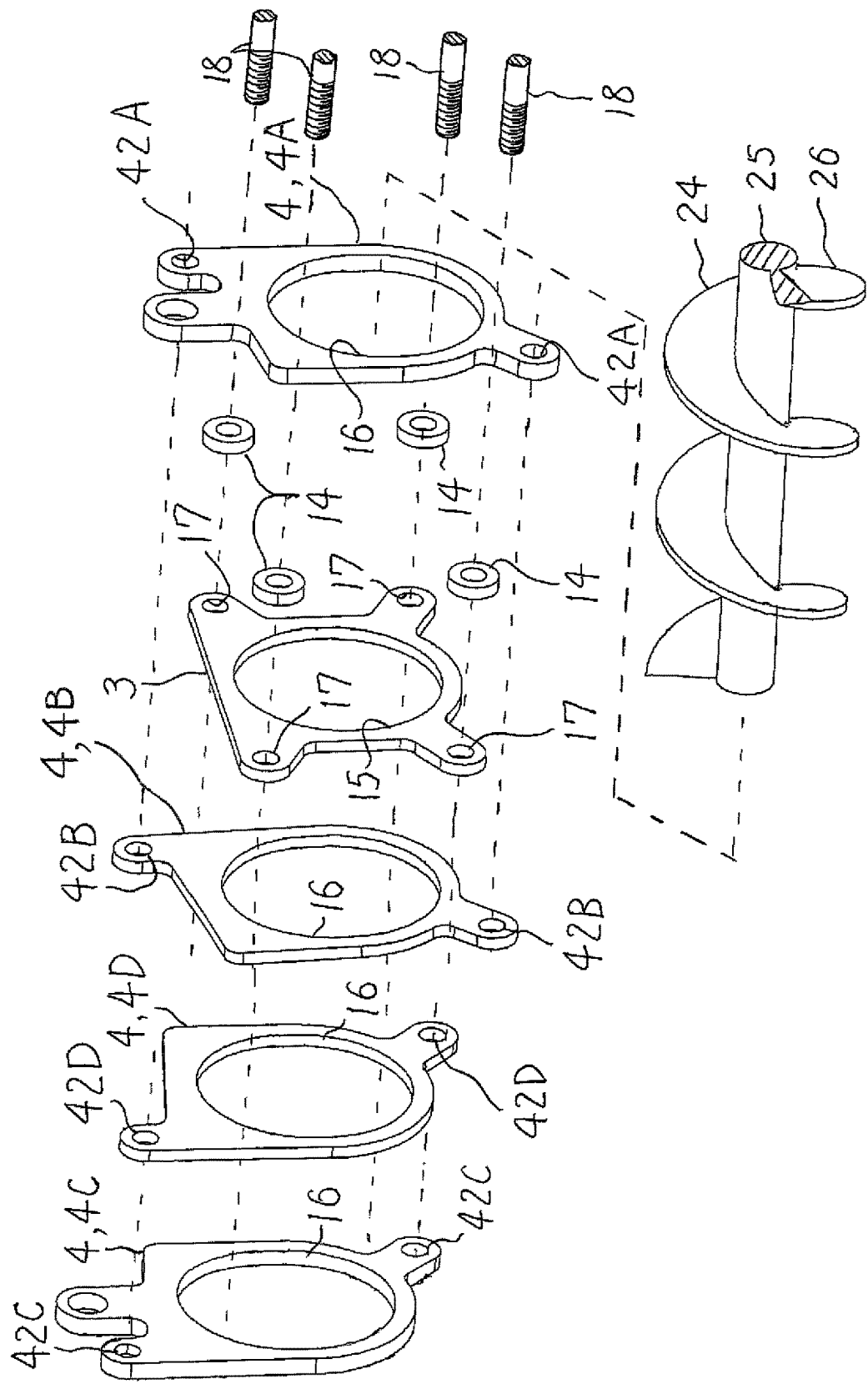
FIG. 2 is a perspective view illustrating the fixed members and the movable members and so forth.

FIG. 2 is a perspective view illustrating one fixed member 3 among the plurality of fixed members and four movable members 4 shown in FIG. 1. As shown in this figure, in this example, a circular hole 15 is formed in the fixed member 3 and an oval hole 16 is formed in the movable members 4, wherein the fixed member 3 and the movable members 4 are composed of a ring-shaped plate material. As shown in FIG. 2, the exemplary solid-liquid separation device employs four kinds of movable members 4, which are referred to as a first driving member 4A, a first driven member 4B, a second driving member 4C and a second driven member 4D for discriminating from one another if necessary. The first and second driven members 4B, 4D are members driven in conjunction with the movement of the first and second driving members 4A, 4C respectively, which will be discussed in more detail later. To note, with reference to FIG. 2, the first driving member 4A and the second driving member 4C are the same in shape and shown reversed front to back, and similarly the first driven member 4B and the second driven member 4D are the same in shape and shown reversed front to back.

Figure 3:
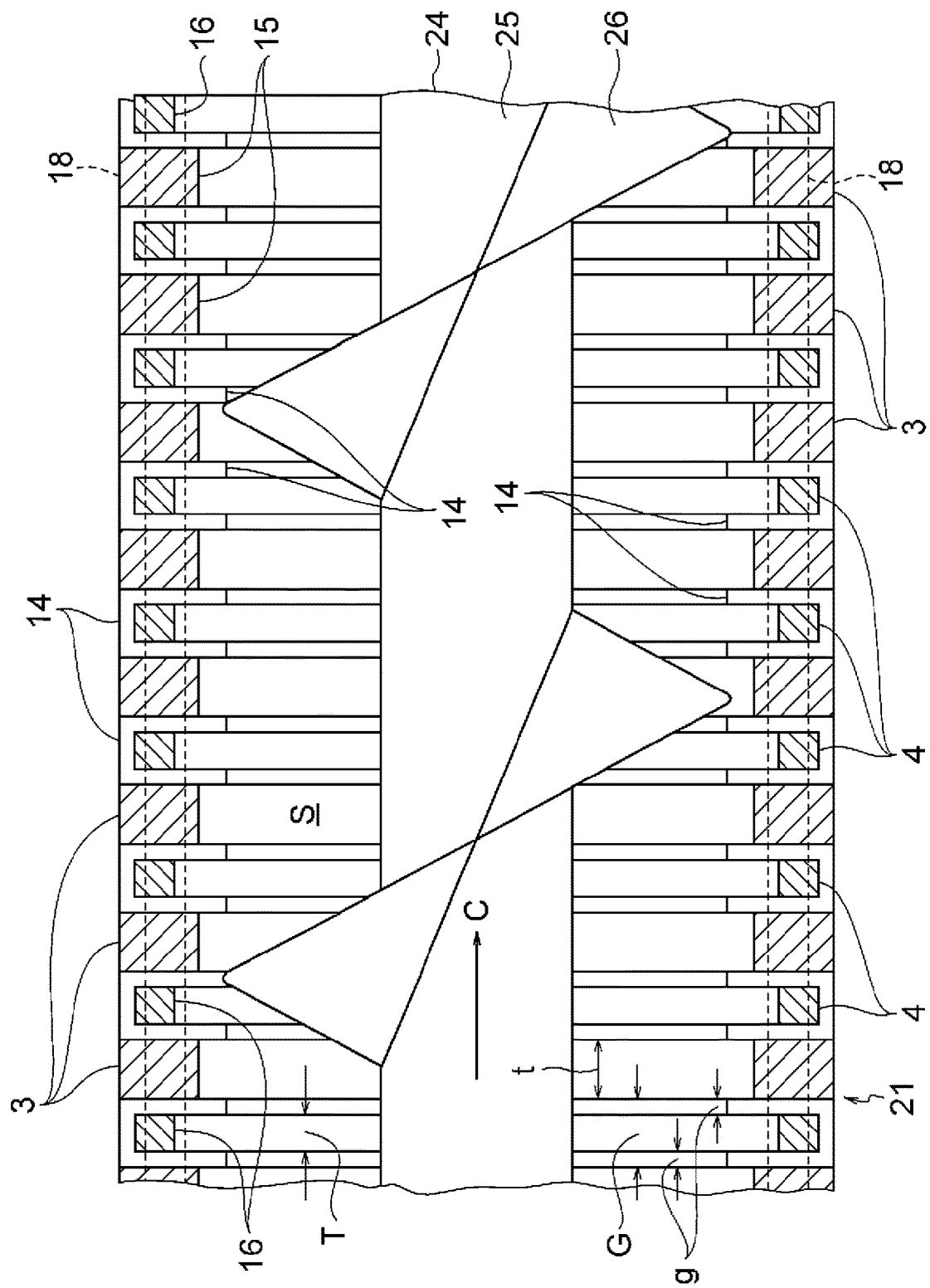
FIG. 3 is a schematic cross-sectional view illustrating a part of the solid-liquid separation portion, which is intended to clarify the arrangement state of the fixed members and the movable members and wherein the shapes and the like of the fixed members and the movable members are simplified and the depictions of some of the constituent members are omitted.
Figure 4:
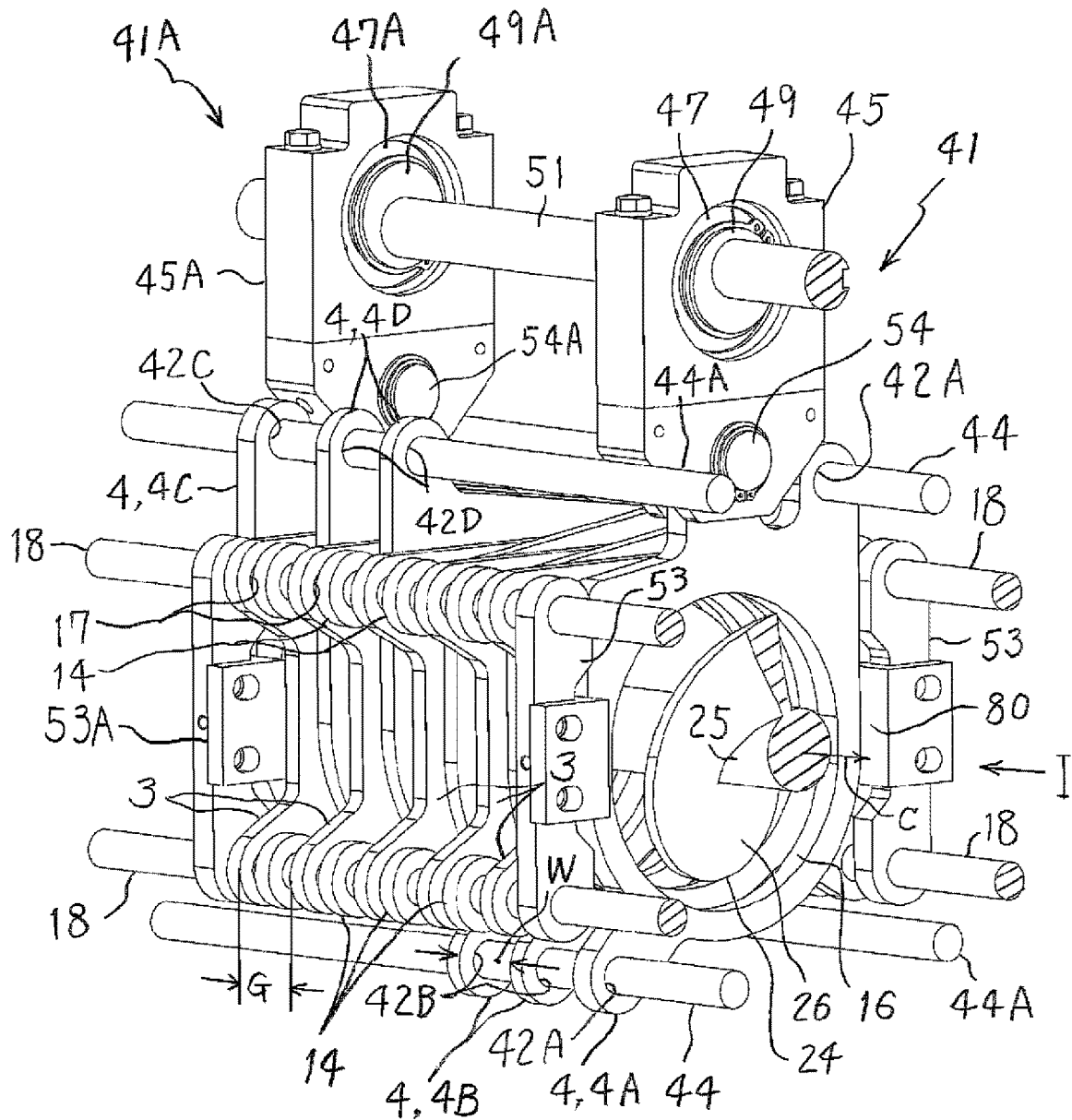
FIG. 4 illustrates the first movable unit and the second movable unit, which corresponds to a perspective view shown with the gap between the movable members and the gap width between the fixed members enlarged further than actual, seen from the downstream side in the sludge conveyance direction.
Figure 5:
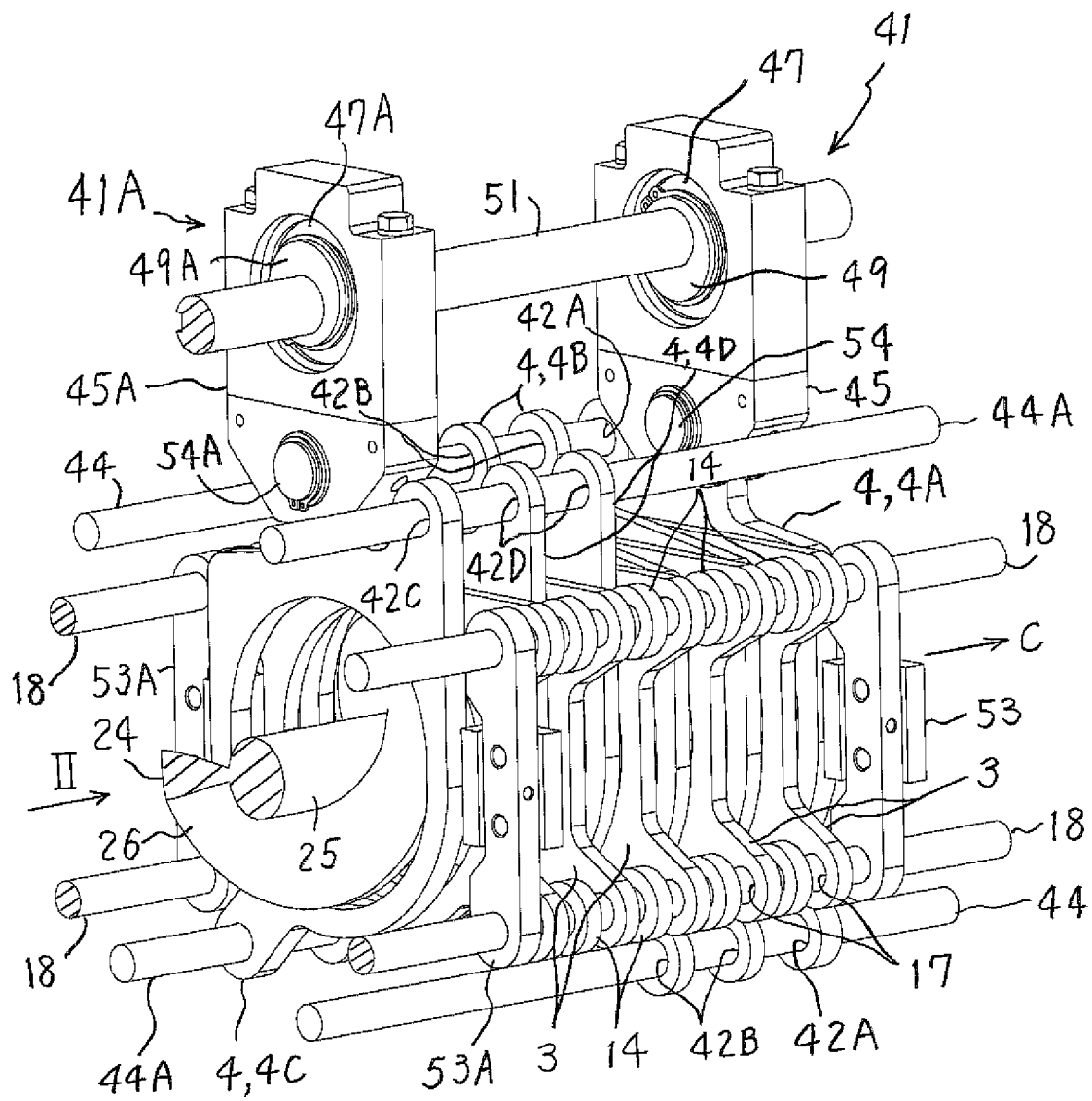
FIG. 5 illustrates the first movable unit and the second movable unit similar to the perspective view depicted in FIG. 4, seen from the upstream side in the sludge conveyance direction.
Figure 6:
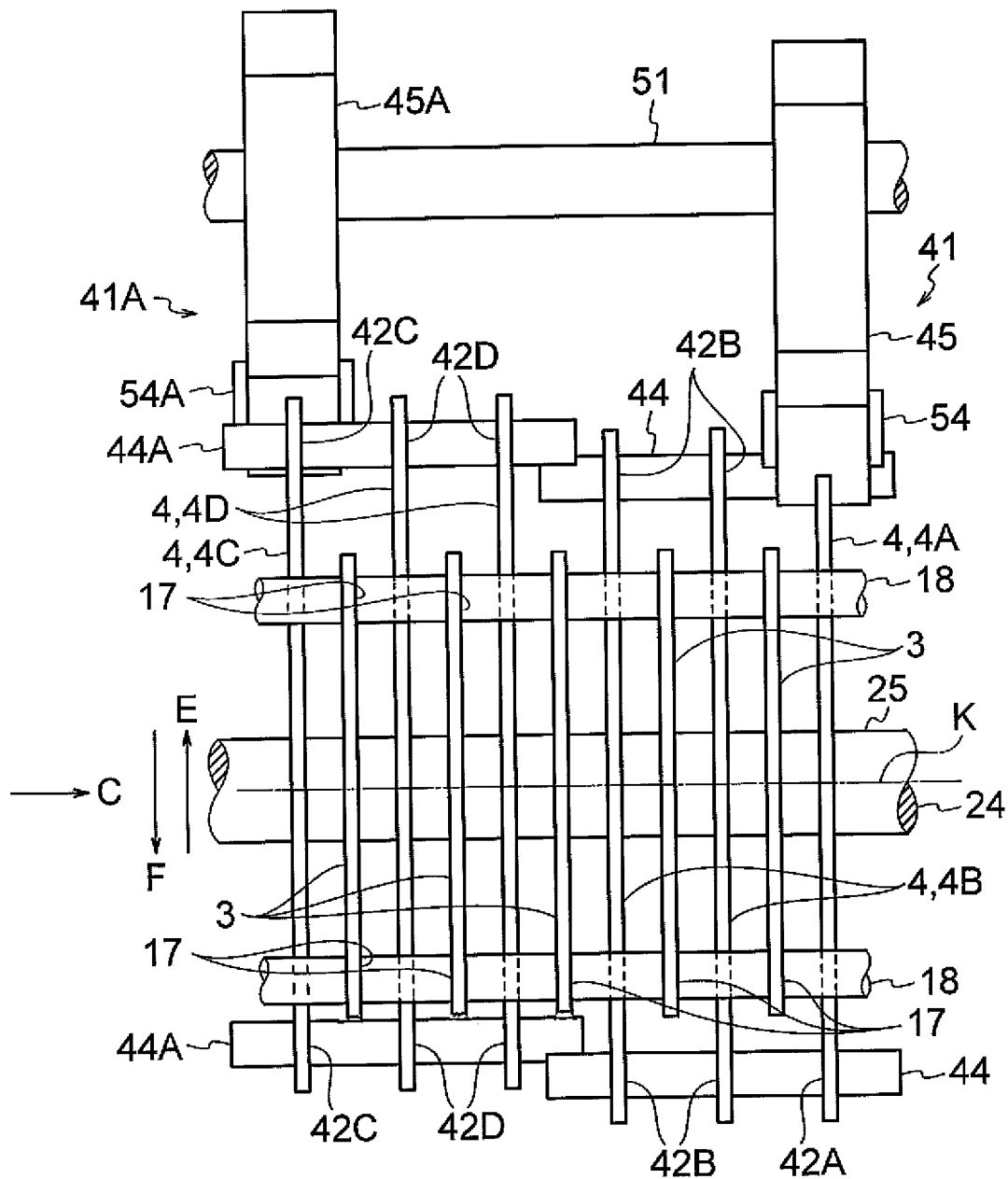
FIG. 6 is a frontal view exemplarily illustrating the arrangement state of the driving member and the driven member constituting the first and second movable units, which corresponds to an illustrative view with the gap between the movable members and the gap width between the fixed members enlarged further than actual and the depiction of the blade unit of the screw omitted.
Figure 7:
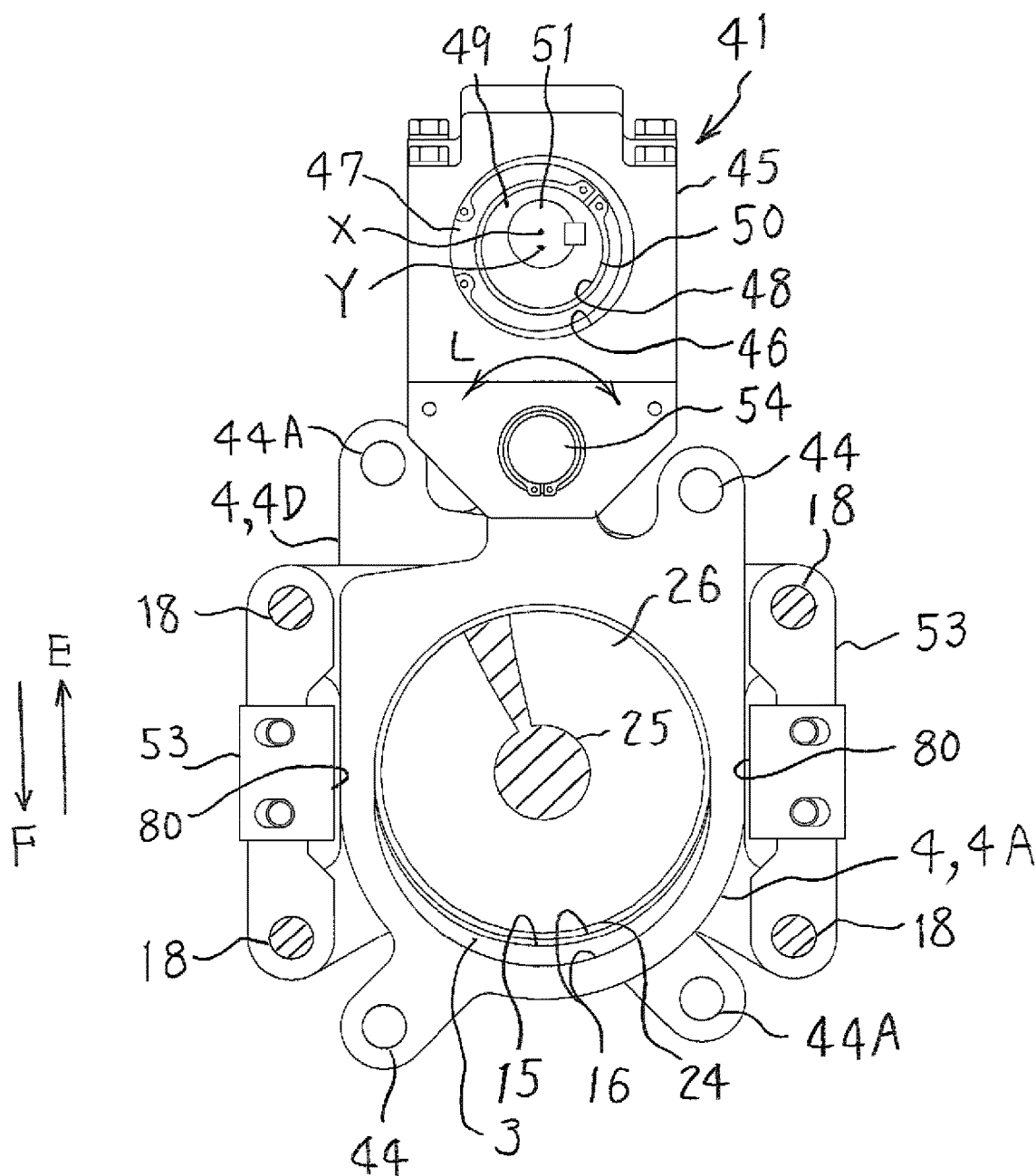
FIG. 7 is a view seen in the direction of the arrow I depicted in FIG. 4.
Figure 8:
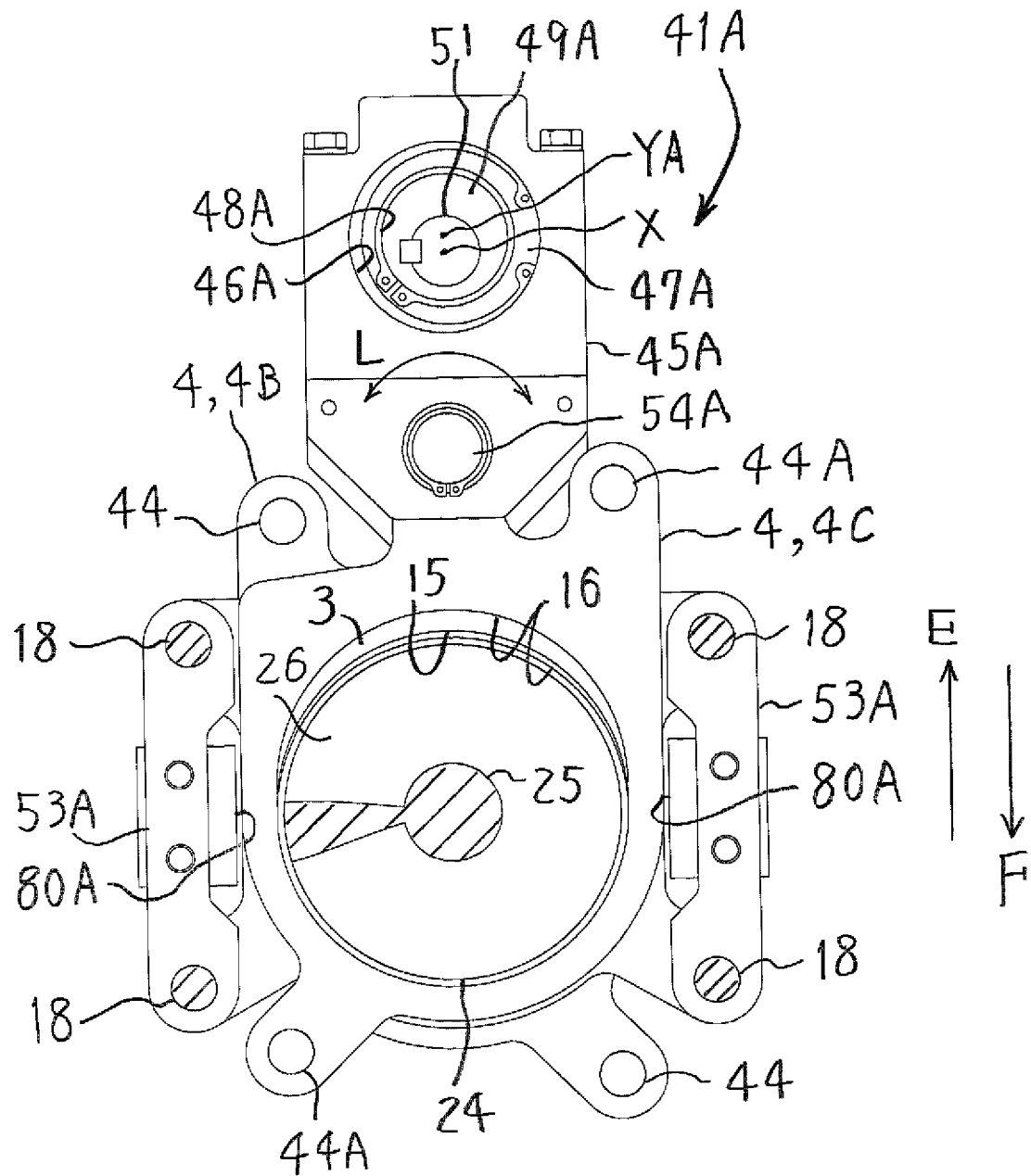
FIG. 8 is a view seen in the direction of the arrow II depicted in FIG. 5.

FIG. 3 is an enlarged cross-sectional view to clarify the arrangement state of a number of movable members and a number of fixed members 3; FIGS. 4 and 5 are perspective views illustrating the state where some of the fixed members 3 among the number of those and some of the movable members 4 are assembled with one another; and FIG. 6 is an illustrative view exemplarily illustrating the state where the fixed members 3 and the movable members 4 are assembled with one another. Moreover, FIGS. 7 and 8 are partially cross-sectional views illustrating the state where the movable members 4 operate, wherein FIG. 7 is a view seen in the direction of the arrow I depicted in FIG. 4 while FIG. 8 is a view seen in the direction of the arrow II depicted in FIG. 5. To note, FIGS. 1, 3 and 6 are views to clarify the arrangement state and the like of the fixed members 3 and the movable members 4, in which the shapes of the fixed members 3 and the movable members 4 are simplified and the depictions of some structural members mentioned below are omitted (which annotation also applies to the illustrations of FIGS. 11 and 12). For more accurate shapes of the fixed members 3 and the movable members 4 of the exemplary solid-liquid separation device, see the illustrations of FIGS. 2, 4, 5, 7 and 8.

As shown in FIGS. 1 to 3, a spacer 14 having a small annular shape is disposed between the adjacent fixed members 3, wherein the plurality of fixed members 3 are disposed concentrically, spaced each other in an axial direction by the spacer 14, and one movable member 4 is disposed between the adjacent fixed members 3. According to the exemplified illustration, four spacers 14 are disposed between the adjacent fixed members 3.

Figure 10:
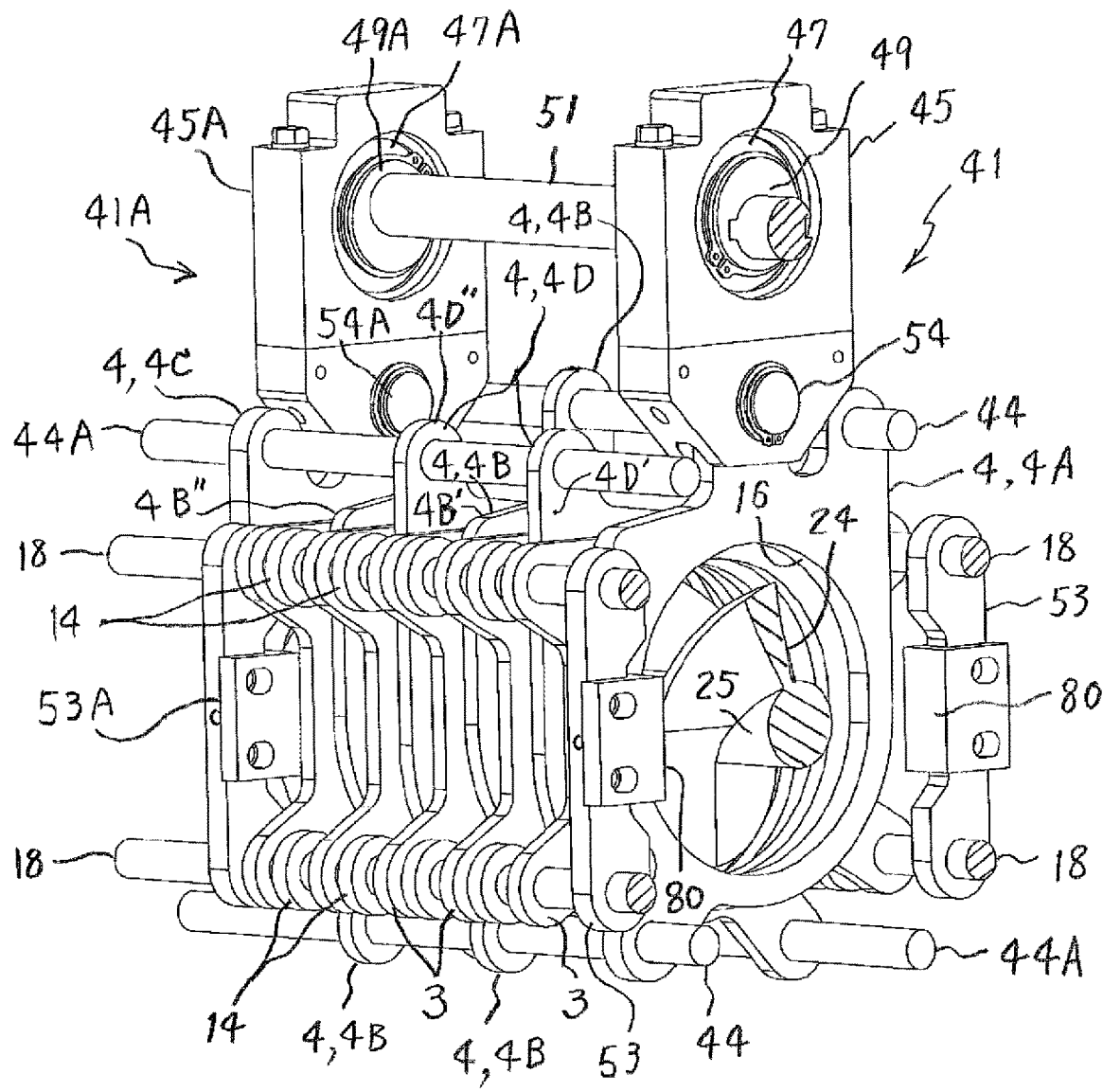
FIG. 10 illustrates another arrangement state of the driving member and the driven member, similar to the perspective view of FIG. 4.
Figure 11:
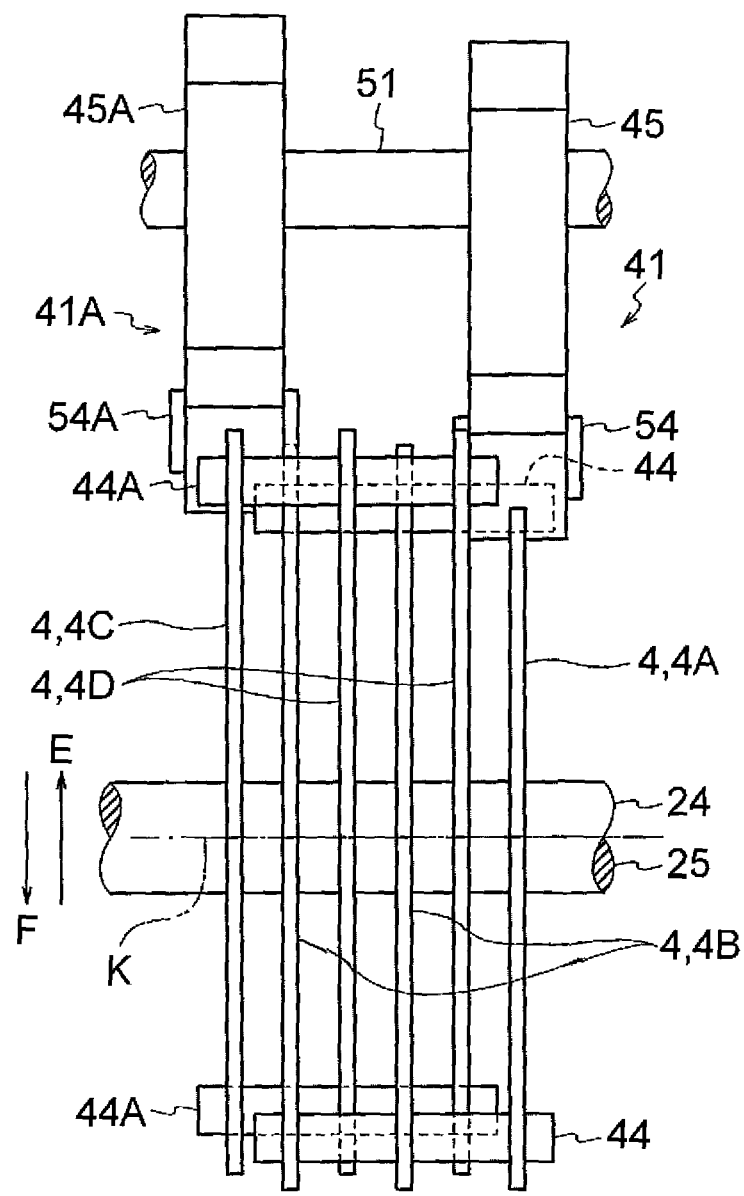
FIG. 11 illustrates another arrangement state of the driving member and the driven member, similar to the illustrative view of FIG. 6 and it is further omitted the depiction of the stay bolts that fixedly connect the plurality of fixed members.
Figure 12:
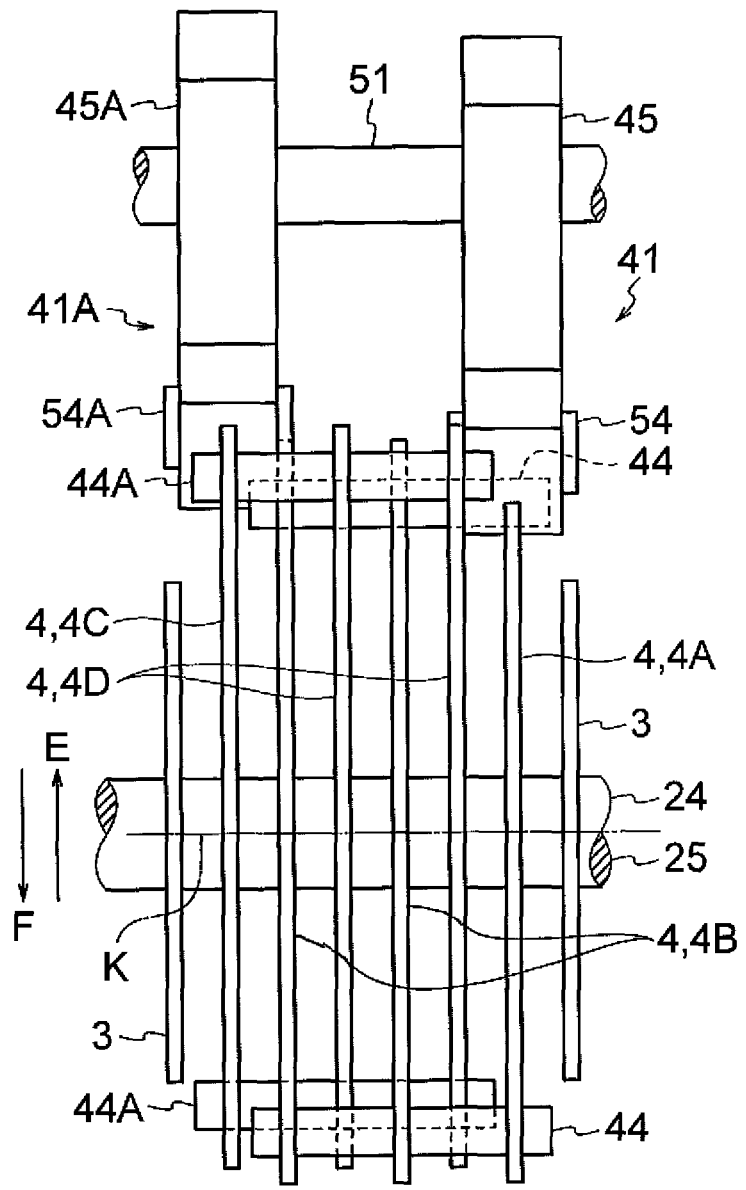
FIG. 12 illustrates further another arrangement state of the driving member, the driven member and the fixed members, similar to the illustrative view of FIG. 11.

The spacer 14 is also shown in FIGS. 4 and 5, wherein the gap width G between the fixed members and the gap W between the movable members are exaggerated for clarifying the state where the fixed members 3, the movable members 4 and the spaces 14 are assembled with one another (which annotation also applies to the illustrations of FIGS. 6, 10 to 13, wherein FIGS. 6, 11 and 12 the depictions of the spacers being omitted). In actual, as can be seen from FIG. 3, each spacer 14 is in close contact with the fixed members 3.

In particular, as shown clearly in FIG. 2, four attachment holes 17 are formed on each fixed member 3, and as shown in FIGS. 1 to 6, each stay bolt 18 extends through a center hole of small annular shaped spacers 14 disposed between each attachment hole 17 and each fixed member 3. Each of the stay bolts 18, as shown in FIG. 1, penetrates through the side wall 7 of the inlet member 1 and the side wall 9 of the outlet member 2, and is clamped with nuts 19 and 20 respectively screwed into a male screw formed on each longitudinal end portion of each stay bolt 18. Thereby, the plurality of fixed members 3 can be integrally and fixedly connected to one another and the fixed members 3 can be secured with respect to the inlet member 1 and the outlet member 2.

The respective fixed members 3 which are spaced apart by the spacers 14 can be assembled so as to allow a very small play thereof. It is also possible to form the spacer integrally with one of the two adjacent fixed members and form a gap between the two adjacent fixed members, so that the movable member 4 can be disposed in said gap.

As shown in FIG. 3, the thickness T of the respective movable members 4 disposed between the respective fixed members 3 is set smaller than the gap width G between the respective fixed members, and a minute filtrate discharge gap "g" for example about 0.1 mm to about 1 mm is formed between the end surface of the respective fixed members 3 and the opposed end surface of the movable member 4. Such minute filtrate discharge gap "g" serves to pass through the liquid separated from the sludge that is the filtrate, in the below-described. The thickness T of the movable member 4 is set to the range of about 1.0 mm to about 2 mm, while the gap width G is set to the range of about 2 mm to about 3 mm. Further, the thickness t of the fixed member 3 is set to the range of about 1.5 mm to about 3 mm. It should be noted that the filtrate discharge gap "g", the thicknesses T and t as well as the gap width G respectively are set appropriately in consideration of the type of an object to be treated and so forth. Upon the solid-liquid separation operating, as described below, the respective movable members 4 disposed between the adjacent fixed members 3 can perform reciprocating motion in a vertical direction indicated with the arrows E, F in FIGS. 6, 7 and 8.

As can be seen from FIG. 1, an inner space S (see FIG. 3) shaped a substantially continuous through hole is formed by the opening 8 formed on the side wall 7 of the inlet member 1, the holes 15 and 16 formed on the fixed member 3 and the movable member 4 respectively, as well as the opening 10 formed on the side wall 9 of the outlet member 2, together. In this way, for the exemplary solid-liquid separation device, a solid-liquid separation portion 21 to separate liquid from an object to be treated (sludge in this example) is composed of the plurality of fixed members 3 which are spaced apart in an axial direction by the spacers 14 and secured to one another with the stay bolts 18, the movable members 4 disposed between the adjacent fixed members 3, the side wall 7 of the inlet member 1, and the side wall 9 of the outlet member 2, wherein the inside of the solid-liquid separation portion 21 is formed to be hollow, an inlet port 22 of the inner space S of the solid-liquid separation portion 21 is constituted by the opening 8 of the side wall 7 of the inlet member 1, and an outlet port 23 of the inner space S of the solid-liquid separation portion 21 is constituted by the opening 10 of the side wall 9 of the outlet member 2.

Within the inner space S of the solid-liquid separation portion 21 mentioned above, a screw 24 extending in the axial direction is disposed. This screw 24 is composed of a shaft portion 25 and a spiral blade portion 26 integrally formed with the shaft portion 25, wherein, as shown in FIG. 1, an end portion of the shaft portion 25 on the side of the inlet member 1 is drivably connected to a screw motor 28 which is fixedly supported on a side wall 27 on the other side of the inlet member 1, while an end portion of the shaft portion 25 on the side of the outlet member 2 is rotationally supported via a bearing on a side wall 29 on the other side of the outlet member 2. To note, to facilitate the understanding of the figure, only the shaft portion 25 of the screw 24 is shown and the depiction of the blade portion is omitted in FIG. 6 (which also applies to the illustrations of FIGS. 11 and 12).

As can been seen from FIGS. 7 and 8, an outer diameter of the blade portion 26 of the screw 24 is not only set smaller than that of the respective holes 15,16 which are formed on the fixed member 3 and the movable member 4 respectively, but also set smaller than that of the openings 8,10 which are formed on the side walls 7,9 respectively, so that there is no case where the screw 24 might come into contact with the movable member 4 and the fixed member 3 as well as the side walls 7 and 9 when the respective movable members 4 are reciprocated in the arrows E, F direction as mentioned below. Further, there is also no case where the respective movable members 4, even when they operate, might come into contact with the aforementioned spacers 14. Thus, the exemplary solid-liquid separation device is provided with the screw 24 which extends through the plurality of movable members 4 and the plurality of fixed members 3 in a state where the screw is not contact with the them.

As denoted with the arrow A in FIG. 1, the sludge containing a great amount of water is fed into the inlet member 1 from the inflow opening 5. In this case, the content ratio of water in the sludge before treatment is about 99 wt %, for example. A flocculant has been mixed in the sludge in advance and the sludge has been flocculated. When this sludge flows into the inlet member 1, the screw 24 is being rotationally driven by the operation of the motor 28 about the center axis K of the screw. Therefore, as denoted with the arrow B in FIG. 1, the sludge flows through the opening 8 formed on the side wall 7 of the inlet member 1 into the inner space S (see FIG. 3) of the fixed members 3 and the movable members 4. Thus, the sludge flows into the inner space S of the solid-liquid separation portion 21 from the inlet port 22 at one end side in the axial direction thereof. To note, the depiction of the sludge in the respective drawings is omitted.

The sludge flowed into the solid-liquid separation portion 21 as mentioned above, as denoted with the arrow C in FIGS. 1, 3 to 6, is conveyed by the screw 24 rotated by the motor 28 toward the outlet port 23 at the other end side in the axial direction of the solid-liquid separation portion 21. At this time, the water separated from the sludge, that is, the filtrate is discharged from the solid-liquid separation portion through the filtrate discharge gaps "g" (see FIG. 3) between the respective fixed members 3 and the movable members 4. The discharged filtrate is received by a filtrate receiving member 30 fixed to the stay 12, as shown in FIG. 1, and then flows downstream through a filtrate discharge tube 31. As the resulting filtrate still contains some solids, said filtrate is subjected again to water treatment together with the other sludge, and then fed back to the solid-liquid separation device for liquid removal treatment.

As mentioned above, the content ratio of water in the sludge within the solid-liquid separation portion 21 has reduced, and the caked sludge with reduced content of water is discharged from the outlet port 23 at the other end side in the axial direction of the solid-liquid separation portion 21 as denoted with the arrow D in FIG. 1. The sludge discharged from the solid-liquid separation portion 21 falls down through the discharge port 11 at the lower portion of the outlet member 2. The content ratio of water in the caked sludge after liquid removal treatment is about 80 wt %, for example. To note, as shown in FIG. 1, the back pressure device 40 is provided opposed to the outlet port 23 of the solid-liquid separation portion 21, and the caked sludge discharged from the outlet port 23 impinges on the back pressure device 40. Therefore, the pressure applied to the sludge existing within the solid-liquid separation portion 21 in the vicinity of the outlet port 23 arises higher, thereby, enhancing the efficiency of dewatering from the sludge.

As mentioned above, the solid-liquid separation device is configured such that by rotationally driving the screw disposed on the solid-liquid separation portion, the filtrate separated from the object to be treated is discharged from the solid-liquid separation portion through the filtrate discharges gaps thereof, and the object to be treated with reduced content ratio of water is discharged from the solid-liquid separation portion through the outlet port thereof. Thus, the object to be treated containing liquid is subjected to liquid removal treatment while conveying by the rotation of the screw. During such operational steps, there is no case where the movable members 4 might come into contact with the screw 24, so that it can prevent the movable members 4 from being rapidly worn out.

There is no substantial difference between the solid-liquid separation device according to the present disclosure and the prior device of this type in basic configuration and basic operational step excepting the shapes of the driving members and the driven members thereof and the configurations relevant to their simplified functions as described above (refer to the disclosure of Japanese Patent Publication No. 4374396B1).

The exemplary solid-liquid separation device comprises the following configuration in order to prevent the filtrate discharge gaps "g" between the fixed members 3 and the movable members 4 from being clogged by solids and to enhance the efficiency of dewatering by applying the squeezing action to the sludge being conveyed through the solid-liquid separation portion when the sludge is dewatered as mentioned above.

The solid-liquid separation device is provided with a number of movable members 4, but, as shown in FIG. 1, some of the movable members among the number of movable members 4 are assembled together as mentioned below to configure integral movable units 41, 41A, 41B and 41C. There are provided with at least two sets of the movable units, but this exemplary solid-liquid separation device is provided with four sets of the movable units, each denoted with reference symbols 41, 41A, 41B and 41C as mentioned above in FIG. 1. Hereinafter, the movable units 41 to 41C are referred to as the first to fourth movable units where appropriate.

Now, in order to clarify the relevant configuration of two movable units adjacent to each other in the direction of the center axis K of the screw 24, by way of one example, the first movable unit 41 positioned on the most downstream side in the sludge conveyance direction and the second movable unit 41A positioned adjacent thereto further on the upstream side than the first movable unit in the sludge conveyance direction are singled out to discuss their specific configurations.

FIGS. 4 and 5 mentioned above are perspective views illustrating the relevant configuration of the aforementioned first movable unit 41 and second movable unit 41A, and FIG. 6 is an illustrative view schematically illustrating the same relevant configuration. FIG. 4 is a view of the first and second movable units 41,41A seen from diagonally downstream in the aforementioned sludge conveyance direction C, while FIG. 5 is a view thereof seen from diagonally in upstream in said conveyance direction C.

The driving member 4A shown in FIG. 2 is one of a number of movable members 4 shown in FIG. 1, while the first driven member 4B is one of other movable members 4. Likewise, the second driving member 4C is one of a number of movable members, while the second driven member 4D is one of other movable members 4.

Herein, typically, each movable unit is provided with the driving member composed of one movable member of the number of movable members 4 and at least one driven member composed of other movable members thereof. According to the example shown in FIGS. 1, 4 to 6, the first movable unit 41 is provided with three movable members 4 in total comprising one first driving member 4A and two first driven members 4B shown in FIG. 2. Similarly, the second movable unit 41A is provided with three movable members 4 in total comprising one second driving member 4C and two second driven members 4D shown in FIG. 2. As shown in FIGS. 1 and 6, the first driving member 4A and two second driven members 4B, 4B of the first movable unit 41, and two second driven members 4D, 4D and the second driving member 4C of the second movable unit 41A are sequentially arranged in the axis K direction of the screw 24.

As shown in FIG. 2, two attachment holes 42A, 42B are formed on the first driving member 4A and the first driven member 4B respectively, and as shown in FIGS. 4 to 6, each connecting rod 44 passes through the respective attachment holes 42A, 42B, wherein the first driving member 4A and two first driven members 4B are integrally and fixedly connected to one another with two connecting rods 44. The connecting rods 44 may pass through the attachment holes 42A, 42B of the first driving member 4A and two first driven members with some play.

Likewise, as shown in FIG. 2, two attachment holes 42C, 42D are formed on the second driving member 4C and the second driven member 4D of the second movable unit 41A respectively, and as shown in FIGS. 4 to 6, each connecting rod 44A passes through the respective attachment holes 42C, 42D, wherein the second driving member 4C and two second driven members 4D are integrally and fixedly connected to one another with two connecting rods 44A. Four connecting rods 44, 44A extend in parallel with the screw 24. In this case, the connecting rods 44A may pass through the attachment holes 42C, 42D of the second driving member 4C and two second driven members 4D with some play as well.

The connecting rods 44 configure one example of the connection means to connect the first driving member 4A and the first driven members 4B of the first movable unit 41 so as to operate together as described below, while the connecting rods 44A configure one example of the connection means to connect the second driving member 4C and the second driven members 4D of the second movable unit 41A so as to operate together as described below.

It can be clearly understood in FIGS. 4 to 6 that the respective the fixed members 3 fixedly connected with the stay bolts 18 is disposed between the respective movable members 4 comprising the first and second driving members 4A, 4C and the first and second driven members 4B, 4D. It should be noted that the aforementioned connecting rods 44,44A and their relevant configurations are not shown in FIGS. 1 and 3.

Figure 9:
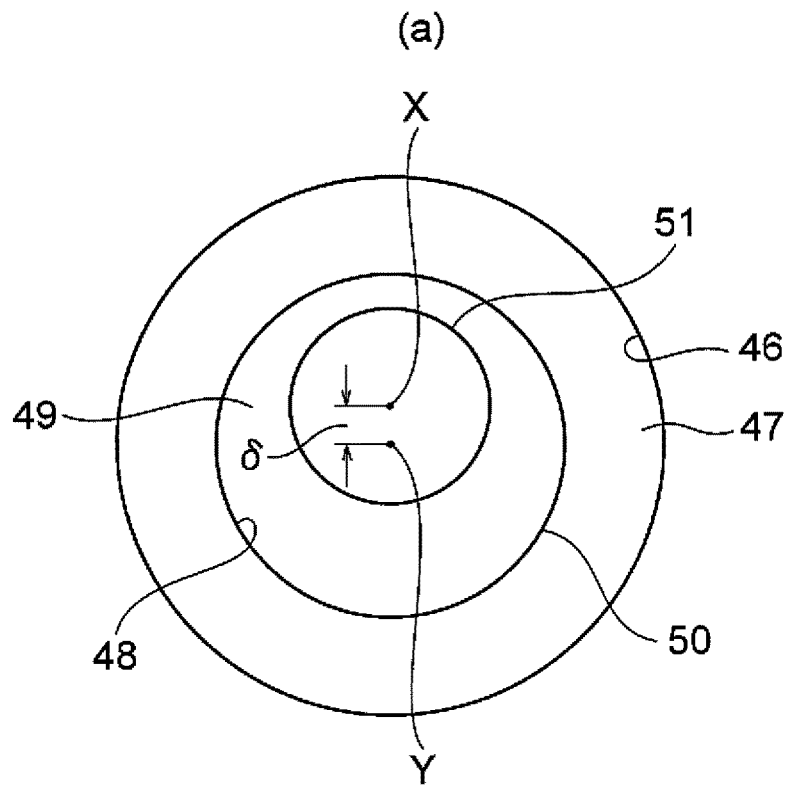
FIG. 9 is an enlarged view, which depicts the cam and the like in FIGS. 7 and 8 and clarifies the action of the cam.
Figure 9:
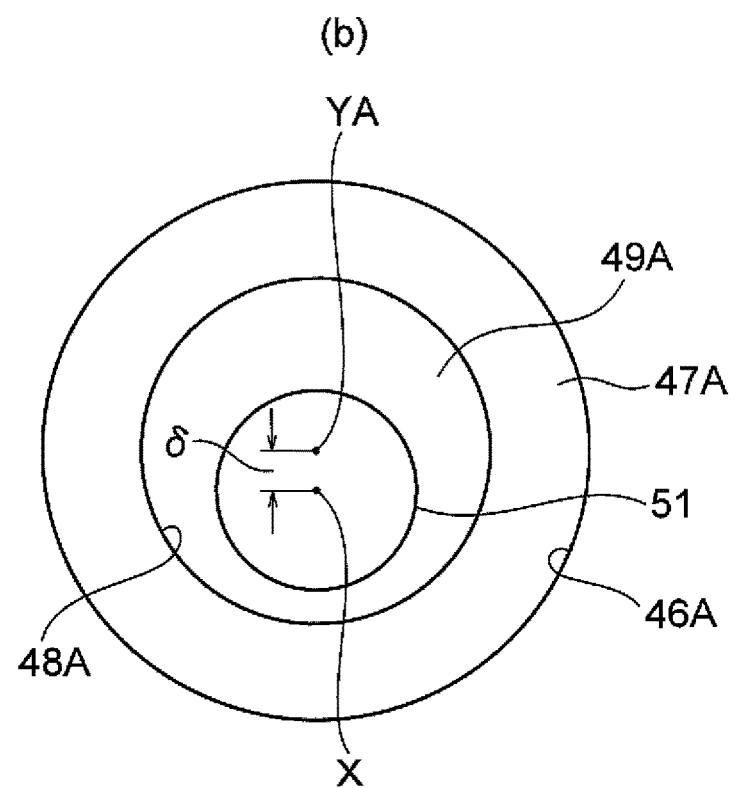

As shown in FIGS. 4 to 7, a first intermediate member 45 is connected pivotally via a pin 54 to the first driving member 4A of the first movable unit 41 in the arrow L direction (see FIG. 7). As also shown in FIG. 9 (a), a hole 46 is formed on the first intermediate member 45, and a bearing 47 constituted by a ring-shaped sliding bearing fits in the hole 46, and the bearing 47 is fixed to the first intermediate member 45. The bearing 47 may slidably fit in the hole 46 of the first intermediate member 45. Further, a circular outer circumferential surface 50 of a first cam 49 constituted by an eccentric cam slidably fits in a round cam hole 48 on the center side of the bearing 47. The driving shaft 51 also shown in FIG. 1 extends through the first cam 49 and the first cam 49 is fixedly connected to the driving shaft 51. As shown in FIG. 9(a), the center axis Y of the first cam 49 is eccentric to the center axis X of the driving shaft 51 by a distance represented by δ. To note, the hatching representing the cross section of the driving shaft 51 is omitted in FIG. 7 (also in FIG. 8).

As shown in FIGS. 4 to 6 and 8, a second intermediate member 45A is also connected pivotally via a pin 54A to the second driving member 4C of the second movable unit 41A in the arrow L direction (see FIG. 8), wherein a sliding bearing 47A fits in a hole 46A formed on the second intermediate member 45A in the same way as the first movable unit 41, and a second cam 49A constituted by an eccentric cam slidably fits in a round cam hole 48A on the center side of the bearing 47A, and the second cam 49A is fixed to the aforementioned driving shaft 51. Thus, the respective movable units 41, 41A are provided with the intermediate members 45, 45A pivotally connected to their driving members 4A, 4C.

Further, as shown in FIG. 9(b), the center axis YA of the second cam 49A is also eccentric to the center axis X of the driving shaft 51 by distance noted δ. In this case, as is clear from the comparison between FIGS. 9(a) and (b), the first cam 49 and the second cam 49A are assembled to the first and second intermediate members 45, 45A respectively with a different phase from each other. Although the magnitude of the phase difference can be set appropriately as required, here the first and second cams 49, 49A are disposed with the phase difference of 180° from each other.

As described above, the first and second cams 49, 49A are fixed to the common driving shaft 51, wherein the driving shaft 51 extends in parallel with the screw 24, and an end of the driving shaft 51 on the side of the outlet member is drivably connected to a cam motor 52 supported on the outlet member 2, while an end of the driving shaft 51 on the side of the inlet member is rotationally supported via a bearing on the inlet member 1.

As described above, when the sludge is dewatered while moving through the inner space S of the solid-liquid separation portion 21, the cam motor 52 operates as well as the screw motor 28, thereby, the driving shaft 51 rotates about the center axis X thereof. That is to say, the driving shaft 51 rotates about its own axis X, and at this time the first and second cams 49, 49A both fixed to the driving shaft 51 also rotates about the axis X of the driving shaft 51. Therefore, the first and second intermediate members 45, 45A perform circular movement with a radius equal to an eccentricity δ about the center axis X of the driving shaft 51. The first and second intermediate members 45, 45A orbitally revolve around the axis X.

At this time, as shown in FIG. 7, since a pair of first guiding members 53 disposed on both sides of the first driving member 4A of the first movable unit 41 are fixed to the stay bolts 18, when the first intermediate member 45 performs the above-mentioned motion, the first driving member 4A connected via the pin 54 to the first intermediate member 45 repeatedly performs linear reciprocating motion in the vertical direction E, F while being guided along the guiding surfaces 80 extending vertically of both of the guiding members 53. Correspondingly, the other two first driven members 4B connected via the connecting rods 44 to the first driving member 4A of the first movable unit 41 repeat linear reciprocating motion in the vertical direction E, F integrally with the first driving member 4A as well.

On the other hand, as shown in FIG. 8, a pair of second guiding members 53A fixed to the stay bolts 18 are disposed on both sides of the second driving member 4C of the second movable unit 41A as well. Therefore, when the second intermediate member 45A performs the above-mentioned motion, the second driving member 4C connected via the pin 54A to the second intermediate member 45A performs linear reciprocating motion in the vertical direction E, F while being guided along guiding surfaces 80A extending vertically with respect to both of the guiding members 53A as well, accordingly the other two second driven members 4D connected via the connecting rods 44A to the second driving member 4C perform linear reciprocating motion in the vertical direction integrally with the second driving member 4C as well.

The first and second guiding members 53, 53A are depicted also in FIGS. 4 and 5, but in order to facilitate the understanding of the figures, the respective guiding members 53, 53A are depicted spaced from the driving members 4A, 4C. Further, as seen from the illustrations of FIGS. 4 and 5, the guiding members 53, 53A fixed to the stay bolts 18 also act as the spacers to maintain the gap between the adjacent fixed members 3, 3.

As described above, when the plurality of movable members 4 comprising the driving members 4A, 4C and the driven members 4B, 4D vertically perform linear reciprocating motion, the respective movable members vertically perform linear reciprocating motion with respect to the fixed members 3 due to the fact that said fixed members 3 are secured in place, thereby, the solids entered into the filtrate discharge gaps "g" (see FIG. 3) between the movable members 4 and the fixed members 3 can be efficiently discharged downward from said gaps "g" so that it can prevent the solids from remaining clogged in said gaps.

Furthermore, since the first cam 49 of the first movable unit 41 shown in FIG. 7 and the second cam 49A of the second movable unit 41A shown in FIG. 8 are disposed with the phase difference of 180° from each other, the first driving member 4A and the first driven member 4B of the first movable unit 41 which perform reciprocating motion together, as well as the second driving member 4C and the second driven member 4D of the second movable unit 41A which perform reciprocating motion together, perform linear reciprocating motion in the vertical direction E, F with the phase difference of 180° from each other.

By way of example, FIG. 7 illustrates the state where the first intermediate member 45 of the first movable unit 41 occupies the lowermost bottom dead point together with the first driving member 4A and the first driven member 4B (also see FIG. 9(a)). At this time, the second intermediate member 45A of the second movable unit 41A shown in FIG. 8 occupies the uppermost top dead point together with the second driving member 4C and the second driven member 4D (also see FIG. 9(b)). The movable members 4 of the first and second movable units 41,41A repeatedly perform reciprocating motion with such phase difference. Therefore, a pressure is applied in a different mode to the sludge being conveyed through the inner space of the second movable unit 41A and the sludge being conveyed through the inner space of the first movable unit 41 positioned to the downstream from the second movable unit 41A in the sludge conveyance direction, so that the squeezing action can be effectively applied to different sludge. Thereby, the movable members 4 can apply greater pressure to the sludge being conveyed even though it operates without contacting with the screw 24, so that the high efficiency of dewatering from the sludge can be ensured. Furthermore, since the first driving member 4A and the first driven members 4B of the first movable unit 41 are connected via the connecting rods 44, it allows the entirety of the first driving member 4A and the first driven members 4B to perform reciprocating motion by the sole first cam 49. This also applies to the second movable unit 41A in the same way, Thereby, the configuration of the device can be successfully simplified. Moreover, since the plurality of cams 49, 49A of the plurality of movable units 41, 41A are rotationally driven with the common driving shaft 51, this also leads to reducing the number of parts for the solid-liquid separation device so as to result in simplifying the configuration of the device as a whole.

The other third and fourth movable units 41B, 41C adjacent to each other shown in FIG. 1 are configured in the same way as the aforementioned first and second movable units 41, 41A, wherein the respective movable units 41B, 41C are provided with the sole driving member and at least one driven member connected to said driving member via the connecting rods as well, and the respective driving members are driven via the intermediate members by the respective cams fixed to the driving shaft 51 shown in FIG. 1 and vertically perform linear reciprocating motion while being guided along the paired guiding members, and then the driving members and the driven members of the respective movable units 41B, 41C vertically perform linear reciprocating motion. Additionally, since the cams of the movable units adjacent to each other in the sludge conveyance direction are disposed with a different phase from each other, the driving members and the driven members of the movable units adjacent to each other perform linear reciprocating motion vertically with a different phase from each other.

The driving member of the third movable unit 41B is denoted with the reference symbol 4E in FIG. 1, thus the plurality of movable members 4 positioned between the driving member 4E and the second movable unit 41A result in the driven members of the third movable unit 41B. Likewise, the driving member of the fourth movable unit 41C is denoted with the reference symbol 4F, thus the plurality of movable members 4 positioned between the driving member 4F and the third movable unit 41B result in the driven members of the fourth movable unit 41C.

In the specific example shown in FIGS. 4 through 8, it is configured such that the first driving member 4A vertically performs linear reciprocating motion by being guided by the paired first guiding members 53 positioned on both sides thereof and the second driving member 4C is likewise guided by the paired second guiding members 53A positioned on both sides thereof, but it may be configured such that the first guiding members guide the first driven member 4B, or both movable members which are the first driving member 4A and the first driven members 4B. This also applies to the second guiding members. Thus, each of the movable units is provided with the guiding means to guide at least one of the driving member and the driven members such that the driving member and the driven member of the movable unit to which said driving member belongs vertically perform linear reciprocating motion when its driving member is applied pressure via the intermediate member of the movable unit by the rotation of its cam, wherein the aforementioned first and second guiding members 53 and 53A constitute one example of said guiding means.

The solid-liquid separation device, discussed above with reference to FIGS. 1 to 9, comprises the plurality of fixed members 3 which are arranged to one another in a state where the plurality of fixed members are not contact with the screw 24 in addition to the plurality of movable members 4, and is configured such that one movable member is disposed between the fixed members 3 positioned adjacent to each other in the axial direction of the screw 24 and the adjacent movable members 4 perform linear reciprocating motion with respect to the fixed members 3 secured in place.

With the solid-liquid separation device shown in FIG. 10, the movable members 4 of the first movable unit 41 and the movable members 4 of the second movable unit 41A are arranged alternatively in the axial direction of the screw 24. That is to say, one of the second driven members 4D (to which the reference symbol 4D' is added in FIG. 10) of the second movable unit 41A is located next to the left of the driving member 4A of the first movable unit 41 at the utmost right side of FIG. 10, and one of the first driven members 4B (to which the reference symbol 4B' is added in FIG. 10) of the first movable unit 41 is located next to the left of the foregoing, and further the other of the second driven members 4D (to which the reference symbol 4D" is added in FIG. 10) of the second movable unit 41A is located next to the left of the foregoing, and yet the other of the first driven members 4B (to which the reference symbol 4B" is added in FIG. 10) of the first movable unit locates next to the left of the foregoing, and the second driving member 4C of the second movable unit is located next to the left of the foregoing, wherein the respective fixed members 3 are positioned between those movable members 4.

The other configuration of the solid-liquid separation device shown in FIG. 10 has no substantial difference with those shown in FIGS. 1 to 9. The solid-liquid separation device shown in FIG. 10 is also configured such that one movable member is disposed between the fixed members 3 positioned adjacent to each other in the axial direction of the screw 24 and the adjacent movable members 4 perform linear reciprocating motion with respect to the fixed members 3 secured in place. Here, the components corresponding to FIG. 4 in FIG. 10 are denoted with the same reference symbols as those in FIG. 4.

With regard to the above-mentioned configuration, it can be also configured such that two movable members 4 positioned adjacent to each other in the axial direction of the screw 24 perform reciprocating motion with a different phase from each other.

FIG. 11 is an illustrative view to present one example of such configuration, wherein the basic configuration of the solid-liquid separation device herein does not differ from those shown in FIGS. 1 to 9. The differences between them lie in that the driving member 4A of the first movable unit 41, two first driven members 4B fixedly connected to said first driving member via the connecting rods 44, the second driving member 4C of the second movable unit 41A, and two second driven members 4D fixedly connected to the second driving member via the connecting rods 44A are arranged alternatively in the axial direction of the screw 24 respectively, and in that there is no provided with the fixed members. That is to say, the respective movable members 4 of the first movable unit 41 and the respective movable members 4 of the second movable unit 41A are positioned adjacent to each other in the axial direction K of the screw 24. For such configuration, the movable members 4 of the first movable unit 41 and the movable members 4 of the second movable unit 41A can also perform linear reciprocating motion with a different phase from each other in the arrows E, F direction, therefore, even with no the fixed members, it can prevent the filtrate discharge gaps "g" (see FIG. 3) between the adjacent movable members from being clogged by solids and the squeezing action is applied to the sludge being conveyed, so that the efficiency of dewatering the sludge can be enhanced. Adopting this configuration, even if it is provided with the fixed members, allows the plurality of movable members of different movable units to be disposed between the fixed members positioned adjacent to each other. In addition, it allows the configuration of the solid-liquid separation device to be simplified since the fixed members can be omitted completely or reduced the number.

FIG. 12 illustrates one example wherein the plurality of movable members 4 are disposed between two fixed members 3 positioned adjacent to each other in the axial direction K of the screw 24 and the plurality of movable members 4, two of which positioned adjacent to each other in the axial direction of the screw 24, perform linear reciprocating motion with a different phase from each other. That is to say, the plurality of movable members 4 positioned between the adjacent fixed members 3 are disposed in the same way as depicted in FIG. 11, and such adjacent movable members perform linear reciprocating motion with a different phase from each other. Thereby, it can be successfully prevented the filtrate discharge gaps between the adjacent movable members 4 from being clogged by solids. To note, the other configurations of the solid-liquid separation device shown in FIG. 12 are the same as the foregoing, wherein both of the fixed members 3 are fixedly connected to each other via the stay bolts not shown in FIG. 12 and the screw 24 extends through the fixed members 3 and the movable members 4 in a state where the screw is not contact with them.

As seen from the above description, the exemplary solid-liquid separation device comprises at least two sets of movable units, wherein the respective movable units are provided with the driving member composed of one movable member of the plurality of movable members and at least one driven member composed of other movable member of the plurality of movable members, the connection means to connect the driving member and the driven members so as to operate together, and the cam to pressurize the driving member so as to perform linear reciprocating motion. It has already mentioned above that in the aforementioned exemplary embodiment, the connecting rods 44, 44A configure an example of said connection means. Furthermore, two cams adjacent to each other in the axial direction of the screw are disposed with a different phase from each other such that the movable members of the movable unit to which each of such cams belongs perform linear reciprocating motion with phase difference, and the cams of the entire movable units are fixed to the common driving shaft rotationally driven by the motor.

As described above, according to the shown specific examples, it is configured such that the plurality of movable units having the driving member and the driven members are provided and the driving member actuates by the rotation of the cam, but the present disclosure is not limited to this. In brief, the solid-liquid separation device according to the present invention comprises the first and second movable units, wherein they are provided with the plurality of movable members, the connection means to connect the plural movable members so as to operate together, and the driving means constituted by for example cams to drive the plurality of movable members, wherein it is needed only that the driving means of the first movable unit and the driving means of the second movable unit are configured such that the movable members of the first and second movable units to perform reciprocating motion with a different phase from each other.

The solid-liquid separation device can be also configured by combining two or three of the following configurations where appropriate: an configuration wherein one movable member is disposed between the fixed members positioned adjacent to each other as shown the specific example shown in FIGS. 1 to 10, an configuration wherein two movable members positioned adjacent to each other are performed reciprocating motion with a different phase from each other as shown in FIG. 11, and an configuration wherein the plurality of movable members are disposed between two fixed members positioned adjacent to each other as shown in FIG. 12.

Figure 13:
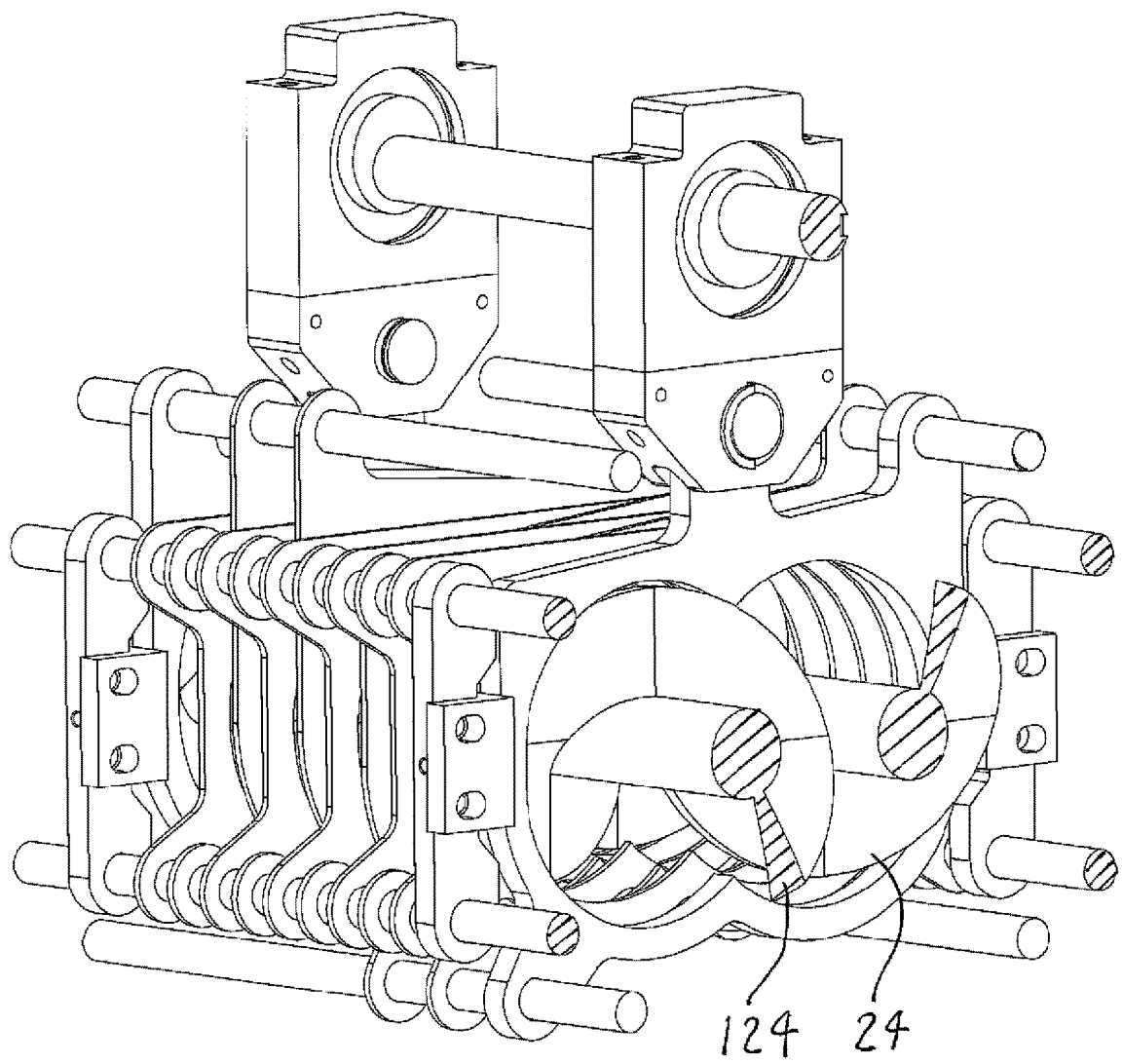
FIG. 13 illustrates a specific example, in which the solid-liquid separation device provided with two screws, similar to the perspective view of FIG. 4.

And now, the solids discharged through the filtrate discharge gaps "g" from the inner space S of the solid-liquid separation portion 21 falls downward from above, therefor if the movable members was configured to vertically perform linear reciprocating motion as the foregoing specific examples, it allows the solids to be effectively discharged from the filtrate discharge gaps "g". However, the present disclosure is not limited to such configuration, and it can be also configured such that the respective movable members perform reciprocating motion not vertically but horizontally as known in the prior art, for instance. Further, in the forgoing specific examples, the movable members 4 and the fixed members 3 are composed of the ring-shaped plate material, but it can be also used the fixed members and the movable members with a recess of which the upper portions is open, as known in the prior art. Further, although the aforementioned solid-liquid separation device comprises one screw, the present disclosure can be also applied to a solid-liquid separation device having two or more screws as well. For these case, refer to the disclosure of Japanese Patent Publication No. 4374396B1. FIG. 13 illustrates one example wherein the present disclosure is applied to a solid-liquid separation device having two screws 24, 124.

In the foregoing specific examples, the cams 49, 49A which are rotationally driven by the driving shaft 51 are adopted for the driving means to actuate the movable members, but any appropriate driving means other than such cams can be also used. For example, as disclosed above and shown in FIGS. 4 and 5 of Japanese Patent Publication No. 4374396B1, disposing an eccentric cam fixed to the driving shaft in the through hole formed on the arm member (intermediate member) fixed to the movable member and rotating the cam can also cause the movable member to perform linear reciprocating motion. The exemplary eccentric cam constitutes the driving means to actuate the movable members.

Otherwise, as disclosed above and shown in FIG. 9 of Japanese Patent Publication No. 4374396B1, fixing the arm member (intermediate member) to the movable member, fitting a member to be pressurized with the hole formed on the arm member, and passing the driving screw through the long hole formed on said member to be pressurized, and rotating said driving screw can also cause the member to be pressurized, the arm member and the movable member to perform linear reciprocating motion. In this example, the aforementioned driving screw constitutes the driving means to actuate the movable members.

Further, the driving means as known in the prior art such as a hydraulic cylinder can also cause the movable members to perform linear reciprocating motion.

Incidentally, with the solid-liquid separation device shown in FIG. 1, it is preferred that the number of revolutions per hour of the screw 24 be set at a value within the prescribed range enabling the sludge to be efficiently dewatered, and it should be avoided the excessively high or excessively low number of revolutions. Whereas, it is preferred that the number of revolutions of the driving shaft 51 for causing the movable members 4 to perform reciprocating motion be set higher so as to cause the movable members 4 perform reciprocating motion with high speed, thereby, discharging the solids entered into the filtrate discharge gaps "g" (see FIG. 3) downward as quickly as possible. In this case, with the solid-liquid separation device shown in FIG. 1, because the screw 24 and the driving shaft 51 are rotationally driven with separate motors 28, 52 respectively, it allows the screw 24 to be rotationally driven at the number of revolutions as desired and the driving shaft 51 to be rotated with high speed so as to be able to cause the movable members to perform reciprocating motion with high speed. The screw 24 and the driving shaft 51 can be rotationally driven at the number of revolutions optimal for their purpose of use, respectively.

It can be also configured such that; the motor 52 is omitted, the gear fixed to the shaft portion 25 of the screw 24 is engaged into the gear fixed to the driving shaft 51, the screw 24 is rotationally driven with the motor 28, and the rotation is transmitted to the driving shaft 51 via the said two gears. In this case as well, it can be configured such that by adjusting the gear ratio of both gears, the screw 24 is driven at the number of revolutions within the prescribed range and the driving shaft 51 is rotationally driven with high speed, so as to cause the movable members 4 to perform reciprocating motion with high speed, thereby, allowing the solids entered into the filtrate discharge gaps "g" to be discharged downward as quickly as possible.

Figure 14:
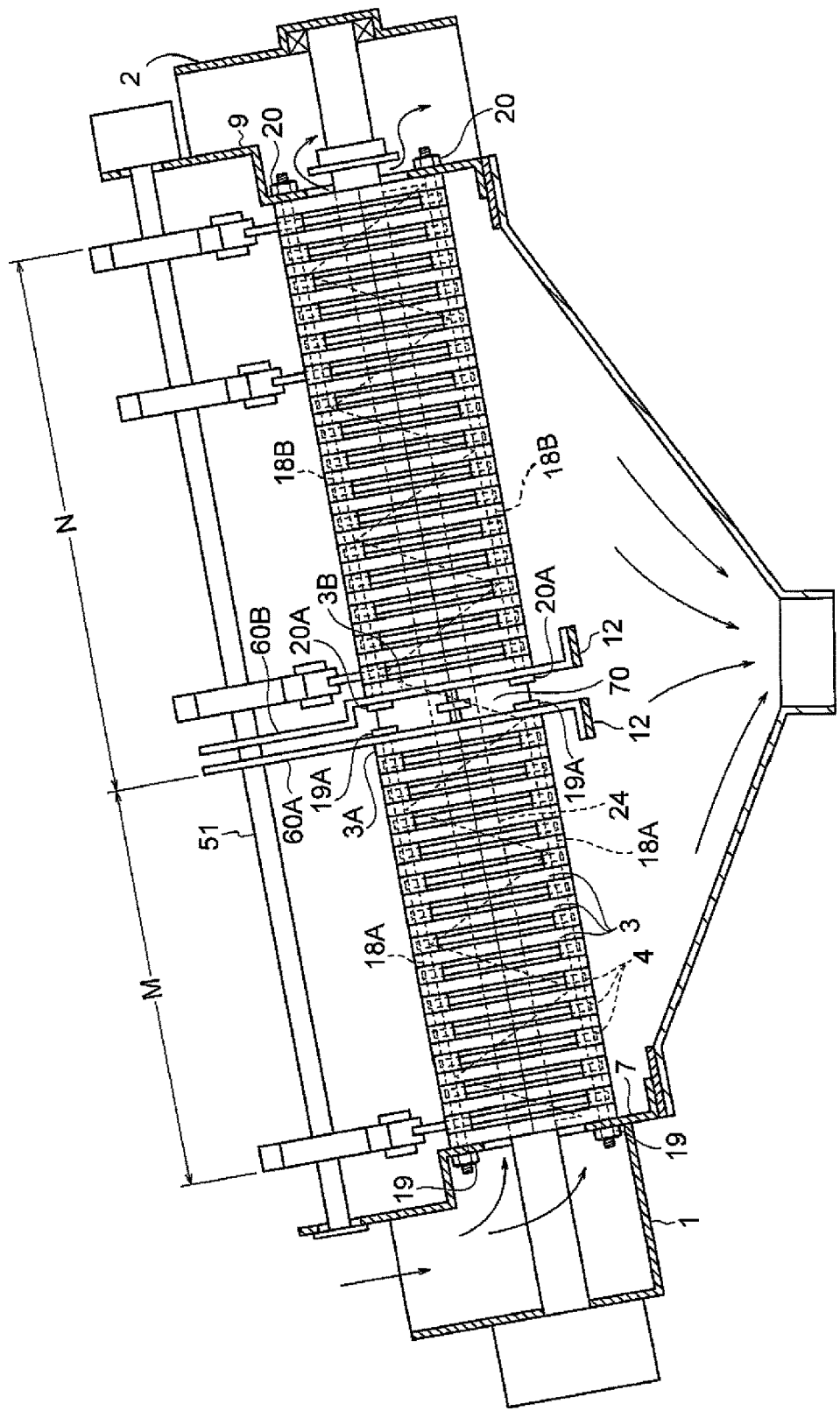
FIG. 14 illustrates another example of the solid-liquid separation device, similar to the partially cross-sectional frontal view of FIG. 1.

With the solid-liquid separation device shown in FIG. 14, the plurality of fixed members 3 and movable members 4 are divided into the upstream side group M and the downstream side group N in the sludge conveyance direction, wherein the fixed member (which is specifically denoted with the reference symbol 3A in FIG. 14) positioned at the most downstream portion of the upstream side group M in the sludge conveyance direction is fixed to a first intermediate support plate 60A, while the fixed member (which is specifically denoted with the reference symbol 3B in FIG. 14) positioned at the most upstream portion of the downstream side group N in the sludge conveyance direction is fixed to a second intermediate support plate 60B. The first and second intermediate support plates 60A, 60B are fixedly supported on the stays 12 at their lower portions, while the intermediate support plates 60A, 60B are rotationally supported on their upper portions to the aforementioned driving shaft 51 via a bearing.

Further, the fixed members 3, 3A belonging to the upstream side group M and the fixed members 3, 3B belonging to the downstream side group N are fixed with separate stay bolts 18A, 18B respectively. In this case, the upstream side stay bolt 18A is fixed to the side wall 7 of the inlet member 1 and the first intermediate support plate 60A via nuts 19, 19A, while the downstream side stay bolt 18B is fixed to the side wall 9 of the outlet member 2 and the second intermediate support plate 60B with nuts 20, 20A.

Figure 15:
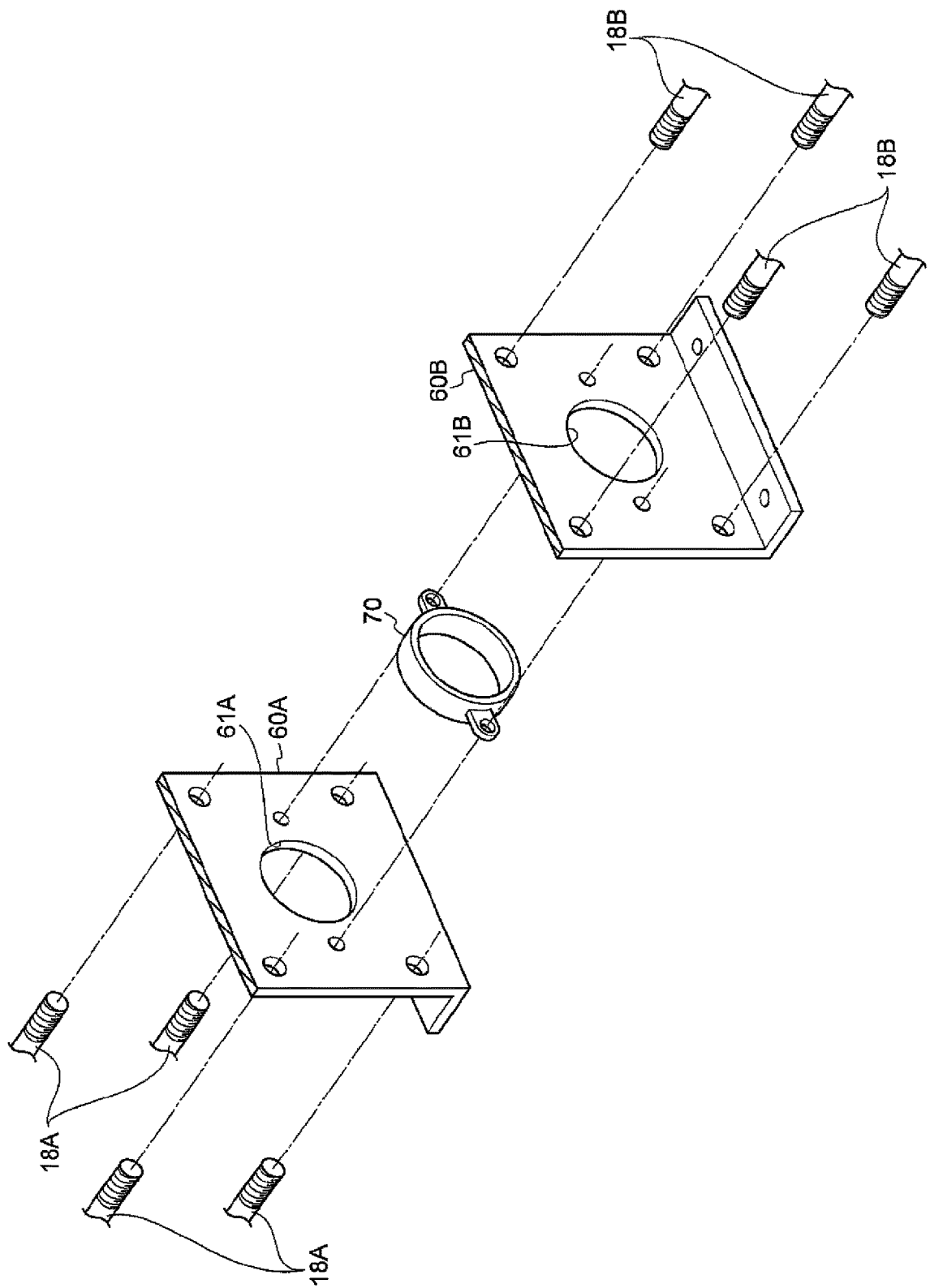
FIG. 15 is an exploded perspective view illustrating the first and second intermediate support plates and the connection tube.

As shown in FIG. 15, through holes 61A, 61B are formed on the first and second intermediate support plates 60A, 60B respectively, through which the screw 24 shown in FIG. 14 passes without coming into contact with them, wherein both of the through holes 61A, 61B are interconnected with each other via the connection tube 70 fixed to both of the intermediate support plates 60A, 60B respectively, and the screw 24 passes through the connection tube 70 without contacting with the connection tube 70.

According to the aforementioned configuration, the stay bolts which connect the fixed members 3 are divided into the upstream side stay bolt 18A and the downstream side stay bolt 18B, wherein each end portion of the upstream side stay bolt 18A is rigidly fixed to the inlet member 1 and the first intermediate support plate 60A, while each end portion of the downstream side stay bolt 18B is rigidly fixed to the second intermediate support plate 60B and the outlet member 2, and both of the intermediate support plates 60A, 60B are rigidly supported to the stays 12, so that the rigidity of the solid-liquid separation device as a whole is enhanced and it can prevent the respective members constituting the device from being elastically and largely deformed during the operation of the device result in reducing the function of dewatering the sludge.

Figure 16:
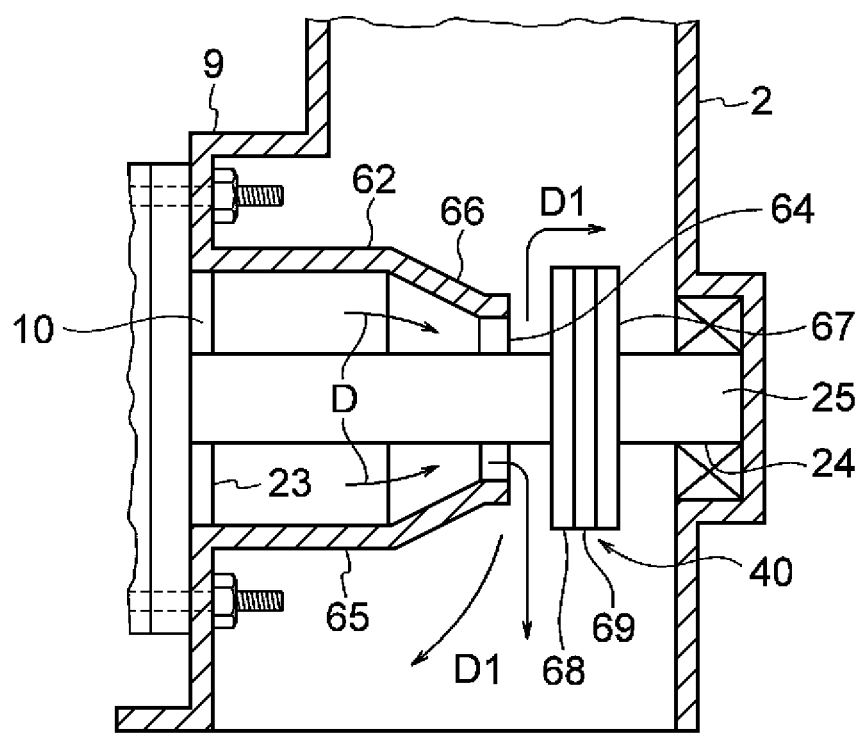
FIG. 16 is a cross-sectional view illustrating an outlet tube member and a back pressure device.

With the solid-liquid separation device shown in FIG. 16, an outlet tube member 62 is fixed to the side wall 9 of the outlet member 2 shown also in FIG. 1 in alignment with an opening 10 formed on said side wall. A back pressure device 40 is disposed opposed to an outlet opening 64 formed on an outlet side end portion of the outlet tube member 62. Further, the outlet tube member 62 is provided with a base portion 65 having substantially a constant diameter and a taper portion 66 which is integrally connected with the base 65 and whose diameter gradually reduces toward the outlet opening 64.

The sludge discharged from an outlet 23 of the solid-liquid separation portion moves to the inner space of the outlet tube member 62 as indicated with the arrow D and is discharged from the outlet opening 64 as indicated with the arrow D1. At this time, the inside of the outlet tube member 62 forms the space surrounded by the inner wall surfaces of the base portion 65 and the taper portion 66, and moreover, the back pressure device 40 is disposed opposed to the outlet opening 64 of the outlet tube member 62, so that large pressure is applied to the sludge moved to the inner space of the outlet tube member 62 under the pressure applied by the solid-liquid separation portion. Since the taper portion 66 gradually reduces its diameter toward the outlet opening 64, the pressure applied to the sludge within the outlet tube member 62 becomes much higher.

As described above, because large pressure is applied to the sludge present within the outlet tube member 62, large pressure is applied to the sludge moving within the inner area of the solid-liquid separation portion adjoining to said member 62 as well. Therefore, the filtrate can be efficiently discharged from the filtrate discharge gaps between the fixed members and the movable members which are positioned in the vicinity of the outlet tube member 62. Accordingly, even reducing the number of the fixed members and the movable members constituting the solid-liquid separation portion still leads to enhancing the dewatering effect of the sludge. The blade portion of the screw 24 can be extended to the inside of the outlet tube member 62.

Further, the back pressure device 40 shown in FIG. 16 is composed of a first receiving member 67 which is fixed to the shaft portion 25 of the screw 24 and rotates with the shaft portion 25, a second receiving member 68 fitted into the shaft portion 25 via a bearing not shown in the drawings and a pressure sensor 69 which is disposed between the first and second receiving members 67, 68 and fitted into the shaft portion 25 via a bearing not shown in the drawings. The second receiving member 68 and the pressure sensor 69 do not rotate with the shaft portion 25, but are slidably fitted into the shaft portion 25 in the center axis direction of the shaft portion 25.

The caked sludge discharged from the outlet opening 64 of the outlet tube member 62 impinges on the second receiving member 68 of the back pressure device 40 and press it. Such pressure is received by the first receiving member 67 fixed to the shaft portion 25 via the pressure sensor 69. At this time, the pressure sensor 69 detects the pressing force of the sludge, that is, the pressure of the sludge within the outlet tube member 62 or within the solid-liquid separation portion in vicinity thereof. Based on the detected result, for example, it is controlled such that the number of revolutions per hour of the screw 24 takes a proper value.

It is well-known from the prior art that the pressure of the sludge within the solid-liquid separation portion in the vicinity of the outlet is detected and the number of revolution of the screw is controlled based on the detected result, but as shown in FIG. 16, providing the pressure sensor 69 at the position opposed to the outlet opening 64 from which the sludge is discharged leads to the sludge discharged from the outlet opening 64 directly pressurizing the pressure sensor 69, so that the pressure of the sludge being conveyed in the vicinity of the outlet of the solid liquid separation portion can be accurately detected. Therefore, the number of revolutions of the screw 24 can be correctly controlled according to the detected pressure.

The other configurations of the solid-liquid separation device excepting the above-mentioned respective configurations with reference to FIGS. 14 to 16 do not differ from those of the solid-liquid separation device described earlier, but the configurations discussed with reference to FIGS. 14 to 16 can be applied to the solid-liquid separation devices of various modes other than the solid-liquid separation device shown in FIG. 1, etc.

As above, the embodiments of the present disclosure have been described, but the present disclosure is not limited to these embodiments or can be modified in various manners.

LIST OF REFERENCE SYMBOLS

3 fixed member
4 movable member
4A, 4C driving member
4B, 4B', 4B", 4D, 4D', 4D" driven member
24 screw
41, 41A, 41B, 41C movable unit
45, 45A intermediate member
46, 46A hole
47, 47A bearing
48, 48A round cam hole
49, 49A cam
51 driving shaft
K, X, Y, YA axis

The invention claimed is:

1. A solid-liquid separation device comprising:
a plurality of movable members;
a screw extending through the movable members in a state the screw is not in contact with the movable members and which subjects an object to be treated containing liquid to liquid removal treatment while conveying the object by revolution of the screw;
at least two sets of movable units that are each provided with:
a driving member composed of one of the plurality of movable members;
at least one driven member composed of other of the plurality of movable members;
a connection connecting the driving member and the at least one driven member so as to operate together; and
a cam to pressurize the driving member so as to cause the driving member to perform linear reciprocating motion,
two of the cams adjacent to each other in an axial direction of the screw being disposed with a different phase from each other such that the movable members of the at least two sets of movable units to which each of the cams belongs perform linear reciprocating motion with a phase difference, and the cams of all the at least two sets of the movable units are fixed to a common driving shaft which is rotationally driven by a motor,
each of the movable units having an intermediate member pivotally connected to the driving member thereof and a guide configured to guide at least one of the driving member and the at least one driven member such that the driving member and the at least one driven member of the at least two sets of movable units to which the driving member belongs perform linear reciprocating motion when the driving member is pressurized via the intermediate member by the rotation of the cam, wherein the cam consists of an eccentric cam, and the cam slidably fits into a round cam hole on a center side of a bearing fitted into a hole formed through the intermediate member.

2. The solid-liquid separation device according to claim 1, wherein the guide guides at least one of the driving member and the at least one driven member such that the at least one driving member and the at least one driven member perform linear reciprocating motion in a vertical direction.

3. The solid-liquid separation device according to claim 1, wherein two of the movable members positioned adjacent to each other in the axial direction of the screw are configured to perform reciprocating motion with a different phase from each other.

4. The solid-liquid separation device according to claim 1, further comprising a plurality of fixed members disposed in a state where the fixed members are not in contact with the screw, wherein the screw extends through the movable members and the fixed members, and one of the movable members is disposed between the fixed members positioned adjacent to each other in the axial direction of the screw.

5. The solid-liquid separation device according to claim 1, further comprising a plurality of fixed members disposed in a state where the fixed members are not in contact with the screw, wherein the screw extends through the movable members and the fixed members, the plurality of movable members are disposed between the fixed members positioned adjacent to each other in the axial direction of the screw, and the plurality of movable members, two of which positioned adjacent to each other in the axial direction of the screw, perform reciprocating motion with a different phase from each other.

* * * * *